(12) United States Patent
Steel

(10) Patent No.: US 12,026,720 B2
(45) Date of Patent: Jul. 2, 2024

(54) BLOCKCHAIN-BASED ASSET AUTHENTICATION METHODS AND SYSTEMS

(71) Applicant: STEEL American Luxury LLC, Winnetka, IL (US)

(72) Inventor: Nicole Steel, Winnetka, IL (US)

(73) Assignee: Steel American Luxury, LLC, Winnetka, IL (US)

( * ) Notice: Subject to any disclaimer, the term of this patent is extended or adjusted under 35 U.S.C. 154(b) by 0 days.

(21) Appl. No.: 18/525,661

(22) Filed: Nov. 30, 2023

(65) Prior Publication Data

US 2024/0177178 A1  May 30, 2024

Related U.S. Application Data

(60) Provisional application No. 63/428,889, filed on Nov. 30, 2022.

(51) Int. Cl.
*G06Q 40/08* (2012.01)
*G06Q 30/018* (2023.01)
(Continued)

(52) U.S. Cl.
CPC ........... *G06Q 30/018* (2013.01); *G06Q 40/08* (2013.01); *H04L 63/0807* (2013.01); *H04L 9/50* (2022.05)

(58) Field of Classification Search
CPC .. G06Q 30/018; G06Q 40/08; H04L 63/0807; H04L 9/50
(Continued)

(56) References Cited

U.S. PATENT DOCUMENTS 11,641,280 B1 * 5/2023 Chapman ................. H04L 9/50
  713/172
2019/0108482 A1 * 4/2019 Vikas ................. G06Q 10/0838
(Continued)

OTHER PUBLICATIONS

Agburu et al., "Effect outsourcing strategies on the performance of small and medium scale enterprises (SMEs)", Journal of Global Entrepreneurship Research, 7:26 . (Year: 2017).*
(Continued)

*Primary Examiner* — Frantzy Poinvil
(74) *Attorney, Agent, or Firm* — Maynard Nexsen PC; Michael Henson

(57) ABSTRACT

Systems and methods for blockchain-based asset authentication are described. The disclosed embodiments leverage the traceability and immutability of blockchains (or distributed ledgers, in general) to enable the authentication and ownership of assets, e.g., luxury goods. In an example, this is achieved by first pairing an authentication chip with a physical product, and writing a transaction correlated with the first pairing to a blockchain. The product being acquired (reacquired) results in the blockchain being updated (e.g., an updated transaction being written to the blockchain) and the (subsequent) owner being provided with a digital passport that can be added to the owner's digital Web3 wallet. The described embodiments advantageously enable digital identities to be associated with physical goods, which adds value for customers making a long-term investment in a luxury good, and promotes sustainability and transparency in manufacturing and retail processes.

20 Claims, 10 Drawing Sheets

(51) Int. Cl.
*H04L 9/40* (2022.01)
*H04L 9/00* (2022.01)

(58) Field of Classification Search
USPC .............................................. 705/3–44, 317
See application file for complete search history.

(56) References Cited

U.S. PATENT DOCUMENTS

| | | | |
|---|---|---|---|
| 2019/0251575 A1* | 8/2019 | Berti | G06Q 30/018 |
| 2019/0333031 A1* | 10/2019 | Kravitz | G06Q 20/06 |
| 2020/0065697 A1* | 2/2020 | Watson | G06Q 10/06393 |
| 2021/0248653 A1* | 8/2021 | McKenzie | H04L 9/3247 |
| 2022/0351165 A1* | 11/2022 | Regenor | G06F 21/10 |
| 2023/0098246 A1* | 3/2023 | Simpson | G06F 1/1632 |
| | | | 707/703 |

OTHER PUBLICATIONS

Chin-Ling et al., "Blockchain-Based Anti-Counterfeiting Management System for Traceable Luxury Products", Sustainability 14 . . . 19: 12814, MDPI AG . . . (Year: 2022).*

* cited by examiner

204

Remove Pass

Polygon Blockchain
S T E E L SmrtKuff™

Polygon Blockchain
French Leather

Polygon Blockchain
Member Federation French Tanners

Polygon Blockchain
2022

Polygon Blockchain
${labelShortSerialLong}

Shop
https://steelamericanluxury.com/

Events
https://steelamericanluxury.com/pages/events

Contact Us
info@steelamericanluxury.com

FIG. 4

BLOCKCHAIN-BASED ASSET AUTHENTICATION METHODS AND SYSTEMS

CROSS-REFERENCE TO RELATED APPLICATION

This application claims priority to U.S. Provisional Application 63/428,889 filed on Nov. 30, 2022, the disclosure of which is hereby incorporated by reference herein in its entirety.

TECHNICAL FIELD

The disclosure generally relates to blockchain technology, and more specifically, to systems and methods for blockchain-based authentication of the ownership of physical goods.

BACKGROUND

Many luxury brands have partnered with distributed ledger technology to track the provenance of products and materials from manufacture to delivery. Using distributed ledgers (e.g., blockchains), brands can digitize, track, and trace the entire lifecycle of a luxury item. With blockchain, brands can create an immutable record of all steps in the supply chain, capture specific data points, such as sustainability certifications and claims, and provide open access to this data publicly. This traceability is also leveraged when using blockchains to support supply chains. For example, blockchain can greatly improve supply chains by enabling faster and more cost-efficient delivery of products, enhancing products' traceability, improving coordination between partners, and aiding access to financing.

SUMMARY

The present disclosure provides systems and methods for blockchain-based asset authentication that leverages the traceability and immutability of distributed ledger technology to enable the authentication and ownership of assets, e.g., luxury goods, the raw materials used in their manufacture, and/or products or goods in a supply chain. In an example, this is achieved by first pairing an authentication chip with a physical product, and creating an initial record (e.g., writing a transaction) on a blockchain. Once the product is sold (or resold), the blockchain is updated (e.g., a new transaction is written with the updated information) and the owner is provided with a digital passport that can be added to the owner's digital wallet. The described embodiments advantageously enable digital identities to be associated with physical goods, which adds value for customers making a long-term investment in a luxury good, and promotes sustainability and transparency in the manufacturing and retail process. In another example, the sourcing and manufacturing processes can benefit from the traceability and immutability of distributed ledger technology. The described embodiments provide methods and systems for registering previously grey area manufacturing, sourcing and supply chain outcomes into a transparent and traceable experience for the consumer, thus creating a valuable experience while also providing for cross-marketing and in real life (IRL) community building and partnership experiences.

In an example aspect, a system for blockchain-based asset authentication is disclosed. The system includes at least one platform server associated with a blockchain platform, at least one database configured to store information associated with a physical good, and at least one application program associated with an owner of the physical good, such as an original purchaser of the good. In this system, the at least one platform server configures a first pairing between the physical good and an authentication mechanism that uniquely identifies and stores a subset of the information, and then writes, using a first application programming interface (API), a transaction that is correlated with the first pairing to the blockchain platform. This is followed by the at least one application program transmitting, to the at least one platform server using a second API different from the first API, a first message indicative of the owner acquiring the physical good. Once the physical good has been purchased or otherwise acquired (e.g., either online or in-person), the at least one platform server receives, from the at least one application program using the second API, the first message. Upon receipt of the first message, the at least one platform server generates, based on the first message and the information associated with the physical good, a digital passport corresponding to the first pairing and a second pairing between the owner and the physical good. Then, another transaction that is correlated with the second pairing is written, using the first API, to the blockchain platform such that the second pairing is immutably linked to the first pairing.

For purposes of this disclosure, "writing" a transaction to the blockchain follows the process which is similar in many blockchain technologies. For example, on Ethereum™ the process of writing a transaction to the blockchain entails a series of operations, including transaction creation, transaction signing, transaction broadcasting, transaction verification and pooling, block formation, block mining (for proof-of-work) or validation (proof-of-stake), and ultimately addition of a block (which includes the transaction) to the blockchain to complete the transaction. For purposes of the present disclosure, the platform server can be one or more computing devices associated with the blockchain which singularly or collectively performs these various operations.

In another example aspect, a method for blockchain-based asset authentication is disclosed. The method includes receiving, by at least one platform server associated with a blockchain platform from at least one database, information associated with a physical good. The at least one platform server then configures a first pairing between a physical good and an authentication mechanism that uniquely identifies and stores a subset of the information, and writes, using a first application programming interface (API), a transaction that is correlated with the first pairing to the blockchain platform. The method continues with receiving, from at least one application program (associated with the owner) using a second API different from the first API, a first message indicative of owner acquiring the physical good. Upon receipt on the first message, the method then generates, based on the first message and the information associated with the physical good, a digital passport corresponding to the first pairing and a second pairing between the owner and the physical good. Another transaction that is correlated with the second pairing is written, using the first API, to the blockchain platform, such that the second pairing is immutably linked to the first pairing.

In yet another example aspect, a system for blockchain-based asset authentication is disclosed. The system includes a processor of at least one platform server associated with a blockchain platform, and a non-transitory memory, coupled to the processor, having code stored thereon, the code, when executed by the processor, causing the processor to perform a series of operations. The operations include receiving, by the at least one platform server from at least one database, information associated with a physical good. The at least one platform server then configures a first pairing between the physical good and an authentication mechanism that uniquely identifies and stores a subset of the information, and writes, using a first application programming interface (API), a transaction that is correlated with the first pairing to the blockchain platform. Next, the at least one platform server receives, from at least one application program using a second API different from the first API, a first message indicative of an owner acquiring the physical good. Upon receipt of the first message, the at least one platform server generates, based on the first message and the information associated with the physical good, a digital passport corresponding to the first pairing and a second pairing between the owner and the physical good. Another transaction that is correlated with the second pairing is written, using the first API, to the blockchain platform, such that the second pairing is immutably linked to the first pairing.

In yet another example aspect, a system for blockchain-based asset authentication is disclosed. The system includes at least one platform server, at least one database configured to store information associated with a raw material for manufacturing a physical good, a first application program associated with a source of the raw material, and a second application program associated with a manufacturer of the physical good. In this example, the at least one platform server is associated with a blockchain platform and a plurality of smart contracts on the blockchain platform, the raw material is sourced in a first jurisdiction, and the physical good is manufactured in a second jurisdiction. The system instructs the first application program to configure (a) a first pairing between the raw material and an authentication mechanism that uniquely identifies the source of the raw material and stores a subset of the information, and (b) a second pairing between the raw material and a verification mechanism that verifies a sourcing of the raw material is compliant with applicable statutes of the first jurisdiction and/or the second jurisdiction. Herein, a compliance of the sourcing is associated with a sourcing identifier. Next, the at least one platform server writes a first transaction correlated with the first pairing and a second transaction correlated with the second pairing to the blockchain platform, with the second pairing being immutably linked to the first pairing and the second transaction comprising the sourcing identifier. Upon detecting that the first transaction and the second transaction have been written to the blockchain platform, a first smart contract generates a digital passport corresponding to the first pairing and the second pairing. The digital passport is transmitted to the source of the raw material and to the second application program, which also receives the sourcing identifier. Upon receiving the digital passport and the sourcing identifier, the second application program transmits the digital passport to a border authority of the second jurisdiction to enable import of the raw material into the second jurisdiction, and configures a third pairing between the raw material and another authentication mechanism that uniquely identifies the manufacturer of the physical good. Finally, upon determining that the raw material has been physically acquired by the manufacturer, a second smart contract revokes or deactivates the digital passport by invalidating a link between the second pairing and the first pairing. Additionally, the second smart contract writes a third transaction correlated with the third pairing to the blockchain platform, such that the third pairing is immutably linked to the second pairing, generates a new digital passport corresponding to the second pairing and the third pairing, and transmits the new digital passport to the manufacturer.

In yet another example aspect, a method for blockchain-based asset authentication is disclosed. The method includes receiving, by at least one platform server from at least one database, information associated with a raw material for manufacturing a first physical good and a second physical good. Herein, the at least one platform server is associated with a blockchain platform and a plurality of smart contracts on the blockchain platform. In this method, the raw material is sourced in a first jurisdiction and at least one of the first or second physical goods is manufactured in a second jurisdiction different from the first jurisdiction, a first portion of the raw material is used to manufacture the first physical good, and a second portion of the raw material is used to manufacture the second physical good. The method continues with configuring (a) a first pairing between the raw material and an authentication mechanism that uniquely identifies a source of the raw material and stores a subset of the information, and (b) a second pairing between the raw material and a verification mechanism that verifies a sourcing of the raw material is compliant with applicable statutes of the first or second jurisdictions. Herein, a compliance of the sourcing is associated with a sourcing identifier. Next, the at least one platform server writes, using a first application programming interface (API), a transaction that is correlated with the first pairing and the second pairing to the blockchain platform, such that the second pairing is immutably linked to the first pairing, and the transaction comprises the sourcing identifier. Upon detecting that the transaction has been written to the blockchain platform, a first smart contract generates a first digital passport corresponding to the first portion of the raw material, the first pairing, and the second pairing, and a second digital passport corresponding to the second portion of the raw material, the first pairing, and the second pairing. Finally, the method concludes with the at least one platform transmitting the first digital passport to the source of the raw material, and transmitting the second digital passport and the sourcing identifier to an application program associated with a manufacturer of the second physical good.

In yet another example aspect, an apparatus comprising a memory and a processor implements the above-described method is disclosed.

In yet another example aspect, the method may be embodied as processor-executable code and may be stored on a non-transitory computer-readable program medium.

The above and other aspects and features of the disclosed technology are described in greater detail in the drawings, the description and the claims.

BRIEF DESCRIPTION OF THE DRAWINGS

The drawings and detailed description that follow are intended to be illustrative and are not intended to limit the scope of the invention as contemplated by the inventors.

FIG. 4 is a screenshot of an example authentication interface.

DETAILED DESCRIPTION

Figure 1:
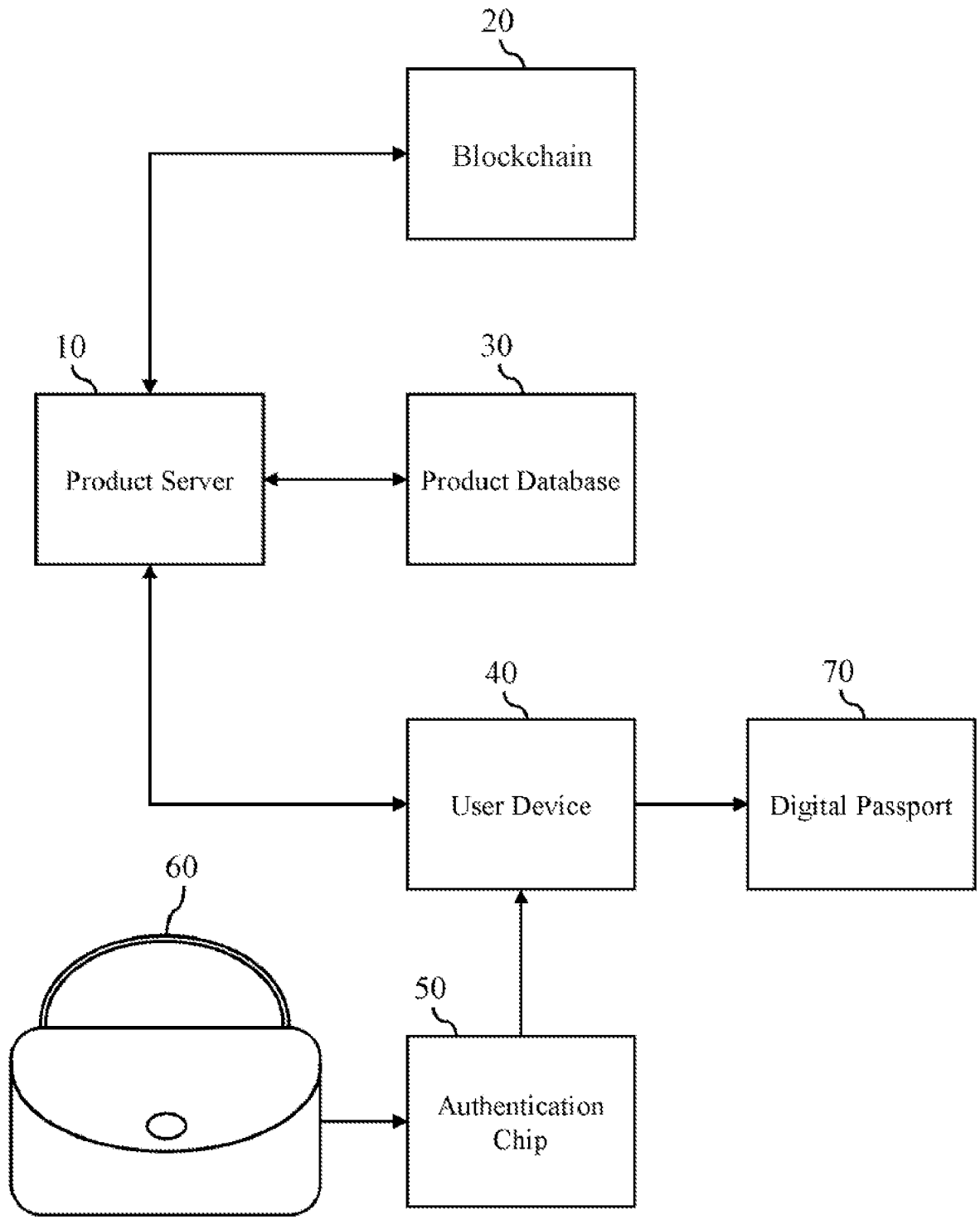
FIG. 1 is a schematic diagram of an example system configured to digitally authenticate ownership of physical goods.

There are a number of significant challenges in the high end product and luxury goods industry that negatively impact vendors and consumers alike. While the quality of luxury goods is generally far above that of standard goods, the differences are often not immediately apparent from general inspection at the time of purchase. As a result, luxury goods are prone to targeting by counterfeiters seeking to produce reasonable counterfeits that may be sold at a steep discount from the actual luxury product, but at a price that is still far above the value of the counterfeit product.

Due to the value of luxury goods and cultural notoriety, they are also frequently targeted for opportunistic or organized theft. As an example, it is becoming increasingly common for a luxury good retail location's inventory to be mostly or entirely stolen by an organized group that simply enters the location's front door during business hours, seizes the goods, and then leaves before security or authorities can intervene. Such goods are then sold directly to buyers in person or using various online marketplaces, leaving buyers at risk for purchased goods later being seized or recovered and returned to the retailer. In certain cases, the counterfeits are made to resemble the original design and materials so closely, experts and corporate inspections are sometimes unable to flag all the counterfeit products and goods.

Since consumable goods and luxury products are produced and sold at relatively high volume, they tend to be fungible and generally indistinguishable from each other, which makes it very challenging to identify or trace counterfeit goods or goods that have been stolen. While manufacturers may incorporate serial numbers or authenticity markings or identifiers to goods, such physical markings are subject to tampering, alteration, or removal, and so provide an imperfect safeguard against counterfeiting and theft.

Implementations of the disclosed technology may be used to digitally record and verify the authenticity and ownership of a variety of different types of goods or products, including but not limited to high-end and luxury goods. As disclosed herein, digital authentication provides a public or semi-public set of authentication records that link to particular manufactured products, and that may also link to particular owners or purchasers of those products. As an example, a luxury purse may be uniquely associated with a record of authenticity in a public blockchain at the time of manufacture.

A subsequent purchase of the purse may then register the product and be uniquely associated with the product records stored in the blockchain, with the purchaser's personal information being stored on the blockchain, in a private database linked to the blockchain records (or transactions), or both. In this manner, the owner of the purse, or a third party capable of accessing the blockchain, may verify the authenticity of the purse based on the blockchain records, which may be helpful in determining that the purse is not a counterfeit, in addition to learning other details such as the location and date of manufacture, materials used during manufacture, and other information. Similarly, the owner of the purse, or a third party capable of accessing the blockchain and/or private database, may verify ownership of the purse based on the blockchain and/or private database records. As one example of the preceding, implementations of the disclosed technology may issue and/or revoke digital passports to owners that register certain goods with the system, and such digital passports may be presented and/or transmitted by the owner to other parties or systems in order to verify authenticity and ownership, or to direct inquirers to the corresponding public/private database records, for example. The ordinarily skilled artisan will appreciate that the disclosed technology can utilize public blockchain architectures and protocols, permissioned blockchain architectures and protocols, private blockchain architectures and protocols, or suitable combinations of these. While the technology leverages off-chain data storage techniques, it is contemplated that aspects of the teachings herein could benefit for on-chain data storage where possible, or combinations of on-chain and off-chain storage.

Since digital authentication in this manner is not subject to tampering, removal, or interference in the same manner that physical serial numbers or authenticity markings are, there is a very clear separation from counterfeit and or/stolen goods. While a counterfeit good may still be bought and sold, the purchaser will immediately realize that it is a counterfeit good when they are unable to register the product with the digital authentications system, and do not receive their digital passport. Similarly, products and goods may still be subject to theft, but such stolen goods will be identified as stolen prior to or during registration with the digital authentication system, and so the purchaser will immediately determine that the product has been stolen. In each case, a possessor of the product will be unable to present or transmit a digital passport authenticating the item and ownership, which makes the item far less desirable to a subsequent purchaser, and allows a subsequent purchaser to quickly and easily determine that the product is likely a result of counterfeiting or theft.

FIG. 1 is a schematic diagram of an example system configured to digitally authenticate ownership of physical goods. As shown therein, a product server (10) is in communication with a user device (40) and configured to provide interfaces and features usable by a user of the user device (40) to authenticate, review, and provide proof of ownership of a purchased product (60). The purchased product (60) includes an authentication chip (50), which may be affixed to a surface of the product or embedded within a portion of the product (60). The authentication chip may vary by product (60) and implementation, and may be, for example, a Radio Frequency Identification (RFID) tag, a Near Field Communication (NFC) tag, or other wirelessly communicating device that is capable of storing and exchanging data wirelessly with nearby devices such as the user device (40). More generally, the purchased product (60) includes an authentication mechanism that could include the authentication chip (50), an imaging device, an outward facing hologram sticker, and so on (and as will be further detailed later). In some implementations, the user device (40) may be a smart phone or other mobile computing device, while the authentication chip (50) may be an RFID or NFC tag, such that the user device (40) may communicate with the chip (50) while the chip is embedded within the material of the product (60).

As will be described in more detail below, when the user device (40) interacts with the chip (50), the user device (40) may be placed in communication with the product server (e.g., via a landing or registration page) to allow the user to complete the registration of their ownership of the product (60). The product server (10) may be configured to require various information from the owner during registration, which may include personal information, contact information, proof of purchase (e.g., photograph or digital documentation of a receipt or other sales document), and other information that may vary by implementation. The product server (10) is further configured to create and store records based upon products (60) relating to their manufacture and ownership, with different records being stored to a product database (30) (e.g., a private database accessible by the product server (10)) and blockchain (20) as will be described in more detail below. By storing such records across a combination of the product database (30) and blockchain (20), the disclosed technology takes advantage of the accessibility and immutability of records stored by the blockchain (20), for example, while preserving the privacy of an owner by storing potentially private information on the product database (30).

Once a product (60) is successfully registered, the product server (10) may provide a digital passport (70) to the user device (40) which may be stored by the user device (40) and presented by the user in varying situations. The digital passport (70) may be, for example, a QR code or other encoded visual identifier, a unique signal or information that may be wirelessly communicated (e.g., an encoded data string that may be communicated via NFC, Bluetooth, or other wireless transmission, or presented as encoded audio, etc.). As will be described in more detail below, the digital passport (70) and related interfaces provided by the user device (40) may be presented to prove ownership of the product (60), provide information relating to the manufacture, source, and/or legal provenance of the product (60), gain access to exclusive events or other benefits, and for other purposes.

Figure 2:
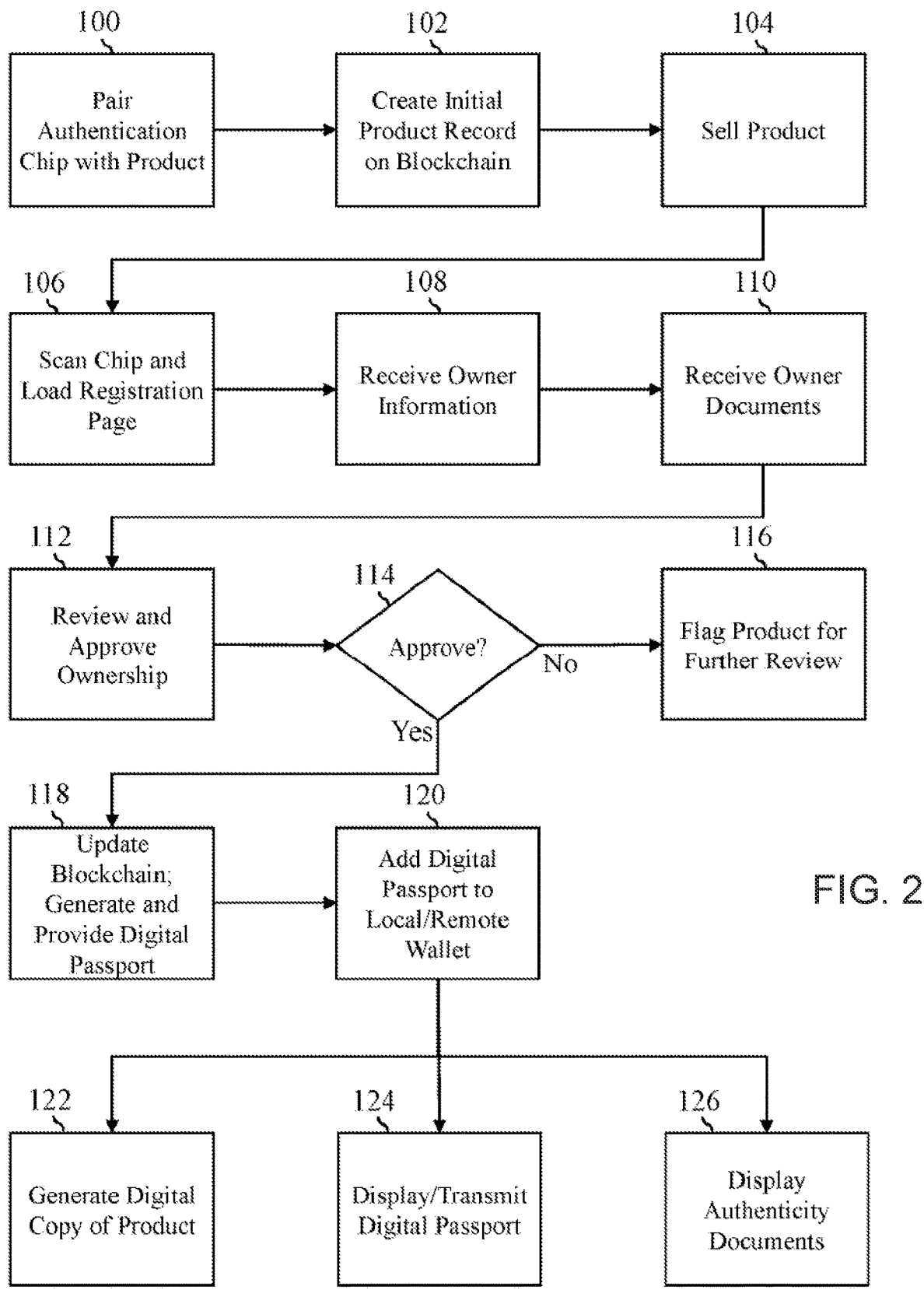
FIG. 2 is a flowchart of an example set of high-level operations that a system performs to digitally authenticate ownership of physical goods.

FIG. 2 is a flowchart of an example set of high-level steps that a system performs to digitally authenticate ownership of physical goods. A system configured to perform steps such as those shown in FIG. 2 provides a user with proof of authenticity and provenance which is registered/tied to the blockchain as well as access to exclusive community features and events (e.g., such as an owners-only social media or communication platform that is only for holders of a digital passport (70)). As products (60) are manufactured and offered for sale, the corresponding authentication chip (50) embedded in each product (60) may configured to be paired (100) with the product (60) so that they are uniquely linked, which may also include writing (102) an initial record to the blockchain (20) to uniquely associate the product (60) with the authentication chip (50) (e.g., by serial number or other unique identifier). After initial registration, the product may be sold (104) to a purchaser.

When a purchaser uses a user device (40) to scan the authentication chip (50) that is embedded in or attached to their purchased product (60), the received information will cause the user device (40) to load (106) a registration page (e.g., such as by opening a web browser and loading a unique web location based on the received information, or by opening another mobile application). The system may receive (108) various owner information via the loaded (106) registration page, which may include an owner's identifying information such as name, location, email address, phone number, and other information. The system may also receive (110) various owner documents via the loaded (106) registration page, which may include photographs of receipts or other proof of purchase of the product (60), photographs of shipping or delivery confirmations, photographs of customs or importation documents, and other information. Received (108, 110) information may be stored on public databases (20), private databases (30), or both, and in varying implementations, private information that identifies the owner may be stored on private databases (30) while anonymous information of public concern (e.g., such as proof of importation, legal provenance, manufacturing data, materials of manufacture, etc.) may be stored on blockchains (20) so that it is publicly available to authenticate the product and/or ownership.

Once owner information (108, 110) is received, a software process may automatically validate ownership by comparing the provided (108, 110) information to transaction records available to the system. In some implementations, such review (112) and approval of ownership may be performed automatically, manually, or both (e.g., both a software process and a manual human review of information and documentation may be performed to approve ownership). Where ownership cannot be approved (114) (e.g., such as due to the product already being associated with an owners, or mismatch of product information with owner information due to error or intentional tampering), the system may flag (116) the attempted product registration for further review, which may require updating stored records or reconfiguration an authentication chip (50), or may require that ownership of the product by a previous owner be updated to reflect ownership by a new owner (e.g., such as resulting by a private sale or transfer of the product as a gift).

Where ownership can be approved (114), the system may update (118) the blockchain (20) to reflect that the product is now owned by an authenticated owner, and may automatically generate and provide to the user device or user (e.g., using their provided contact information) a unique digital passport. As described, a digital passport (70) may be an encoded visual indicator, encoded data string for wireless transmission, or other signal or condition that may be presented via a user device's features or capabilities. The digital passport may be received by the user device and added (120) to a local or remote digital wallet associated with the user device. Addition (120) of the passport to a digital wallet (e.g., a Web3 wallet) associated with the user device may be performed automatically via a web browser or other mobile application during registration, or may be performed as a result of single click or other simple operation. Once added (120) to a digital wallet, the digital passport may be stored and accessed by the user as needed and for various purposes. In some implementations, the product server (10) may be configured to issue and revoke digital passports, such as may be necessary when a digital passport is issued to a first owner of a product, and such product is subsequently transferred to and registered by a subsequent owner.

While a valid digital passport is stored on a user device, the user may use the passport to receive various benefits or exclusive features associated with ownership of the product. As an example, this may include using the digital passport to prove ownership and generate (122) or receive a digital copy of the product that corresponds to the product itself (e.g., such as may be imported into, registered with, or used with various virtual reality, augmented reality, or standard virtual environments, games, or platforms). In this manner, a holder of the digital passport may be able to generate (122) and receive digital copies of their corresponding product in various games or social networks.

As another example, the digital copy of the corresponding product may be limited to a single "digital twin" that enjoys the same traceability and exclusively of the original product, and can be used in digital environments, e.g., the metaverse, Second Life™, etc. In some cases, the physical good and its digital twin must have the same owner and must be transferred (e.g., sold on the secondary market) together. In other cases, the digital twin of the physical good may be transferred (e.g., either sold or rented) to a different person. In yet other cases, multiple digital twins may be generated as previously discussed.

As another example, the user may display or transmit the digital passport, or a portion of part of the digital passport, in order to uniquely identify themselves as the owner of the corresponding product. This may be used to access certain special events (e.g., such as a party, concert, sporting event, or other real world activity where the digital passport serves as the holder's ticket or key to enter the event) by displaying a QR code or other optical code, providing a wireless authentication transmission, or other similar communication of the digital passport. Other examples include using the digital passport (124) to access private social networks or communication channels, receive early access to online content or events, receive discounts on purchases of products or services, and other examples.

As another example, the holder of the digital passport may be able to display (126) authenticity documents associated with the corresponding product. This may include displaying proof of ownership, proof of authenticity, and other information. This may also include displaying proof of legality or legal provenance, such as where a certain product may contain or be manufactured from materials that are either legally restricted for ownership or important into certain countries, or where a certain product may be independently verified by a nongovernmental agency to verify that its materials were ethically sourced, and so on. As one example, where a certain product contains alligator skin or other naturally sourced materials that may be subject to importation laws or other legal restrictions, the displayed (126) documents may include descriptions of the materials that are included in the product, copies of importation documents, copies of legal documents or information proving their legality, and other similar documentation.

Figure 3:
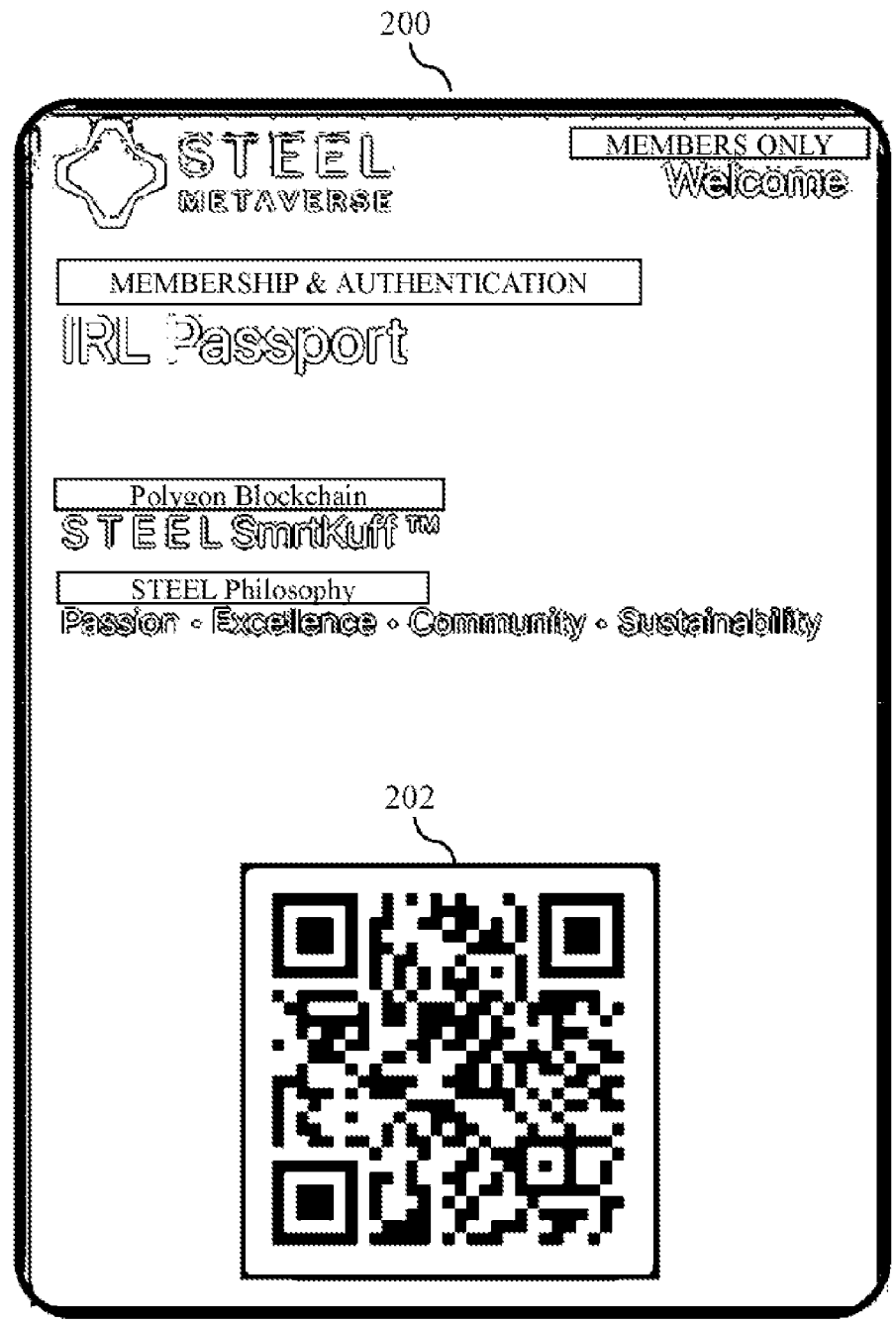
FIG. 3 is a screenshot of an example digital passport interface.

FIG. 3 is a screenshot of an example digital passport interface (200) such as might be presented when displaying (124, 126) passport or authenticity information. An optical code (202) is shown that may be uniquely generated for the owner and product at the time of registration, and that may serve as the owner's digital passport in some situations. FIG. 4 is a screenshot of an example authentication interface (204) that may be displayed by holders of a valid digital passport, and that may contain information from the blockchain (20), product database (30), or both. As depicted in FIG. 4, the interface (204) includes non-private information such as may be stored on the blockchain (20), and may be useful for public audit or review of product ownership and provenance.

Figure 5:
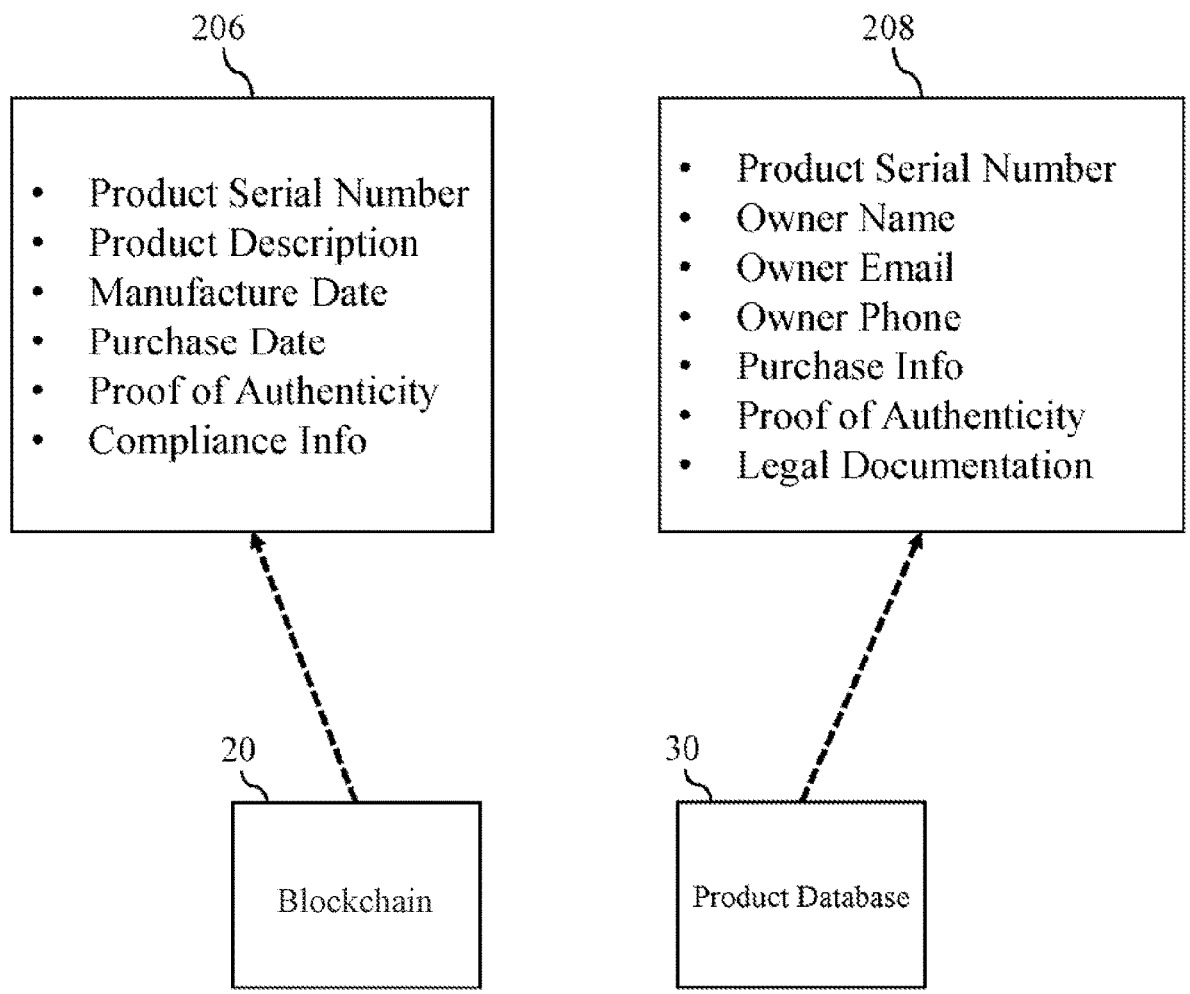
FIG. 5 is a schematic diagram illustrating example information stored by public and private databases.

FIG. 5 is a schematic diagram illustrating example information stored by public and private databases. As has been described, the blockchain (20) and product database (30) may be configured to store public and private data respectively, and may link such information together via a commonly shared primary key (e.g., product serial number). In this manner, members of the public that are familiar with the blockchain (20) may verify the existence, authenticity, and anonymous ownership of products by accessing the blockchain (20) directly (e.g., and avoiding the product server (10) entirely). In the same manner, owners of products or administrators of the product server (10) may combine records from the product database (30) with publicly available records to provide a complete picture of ownership, which may be useful when attempting to trace ownership of a lost or stolen product, to update product ownership when a product is sold or otherwise transferred to a subsequent owner, and in other situations.

Figure 6:
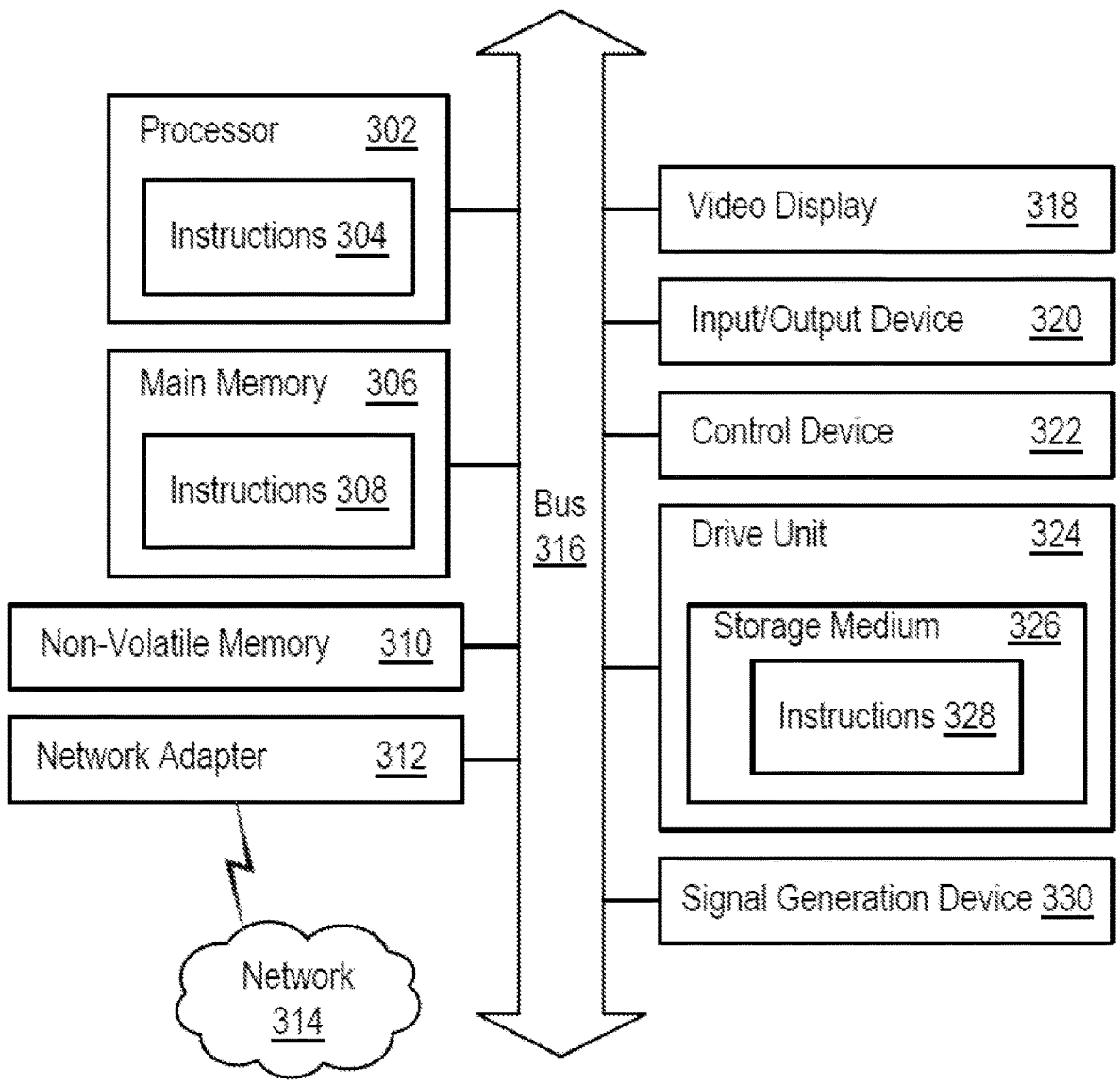
FIG. 6 is a schematic diagram illustrating an example processing system in which at least some operations described herein can be implemented.

FIG. 6 is a schematic diagram illustrating an example processing system (300) in which at least some operations described herein can be implemented. For example, components of the processing system (300) may be hosted on a computing device using which an individual is able to interact with the blockchain-based tokenization system for data access and/or the web-based platform that accesses the web-facing segregated data storage (e.g., through interfaces presented via a computer program, such as a mobile application, desktop application, or web browser). As another example, components of the processing system (300) may be hosted on a computing device on which aspects of the described systems and platforms are implemented.

The processing system (300) may include any combination of a processor (302), main memory (306), non-volatile memory (310), network adapter (312), video display (318), input and output devices (320), control device (322) (e.g., a keyboard or pointing device), drive unit (324) including a storage medium (326), and signal generation device (330) that are communicatively connected to a bus (316). The bus (316) is illustrated as an abstraction that represents one or more physical buses or point-to-point connections that are connected by appropriate bridges, adapters, or controllers. The bus (316), therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), inter-integrated circuit (I2C) bus, or an Institute of Electrical and Electronics Engineers (IEEE) standard 1394 bus (also referred to as "Firewire").

While main memory (306), non-volatile memory (310), and storage medium (326) are shown to be a single medium, the terms "machine-readable medium" and "storage medium" should be taken to include a single medium or multiple media (e.g., a centralized/distributed database and/or associated caches and servers) that store one or more sets of instructions (328). The terms "machine-readable medium" and "storage medium" shall also be taken to include any medium that is capable of storing, encoding, or carrying a set of instructions for execution by the processing system (300).

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 304, 308, 328) set at various times in various memory and storage devices in a computing device. When read and executed by the processor (302), the instruction(s) cause the processing system (300) to perform operations to execute elements involving the various aspects of the present disclosure.

Further examples of machine- and computer-readable media include recordable-type media, such as volatile memory and non-volatile memory (310), removable disks, hard disk drives, and optical disks (e.g., Compact Disk Read-Only Memory (CD-ROMS) and Digital Versatile Disks (DVDs)), and transmission-type media, such as digital and analog communication links.

The network adapter (312) enables the processing system (300) to mediate data in a network (314) with an entity external to the processing system (300) through any communication protocol supported by the processing system (300) and the external entity. The network adapter (312) can include a network adaptor card, a wireless network interface card, a router, an access point, a wireless router, a switch, a multilayer switch, a protocol converter, a gateway, a bridge, bridge router, a hub, a digital media receiver, a repeater, or any combination thereof.

Figure 7:
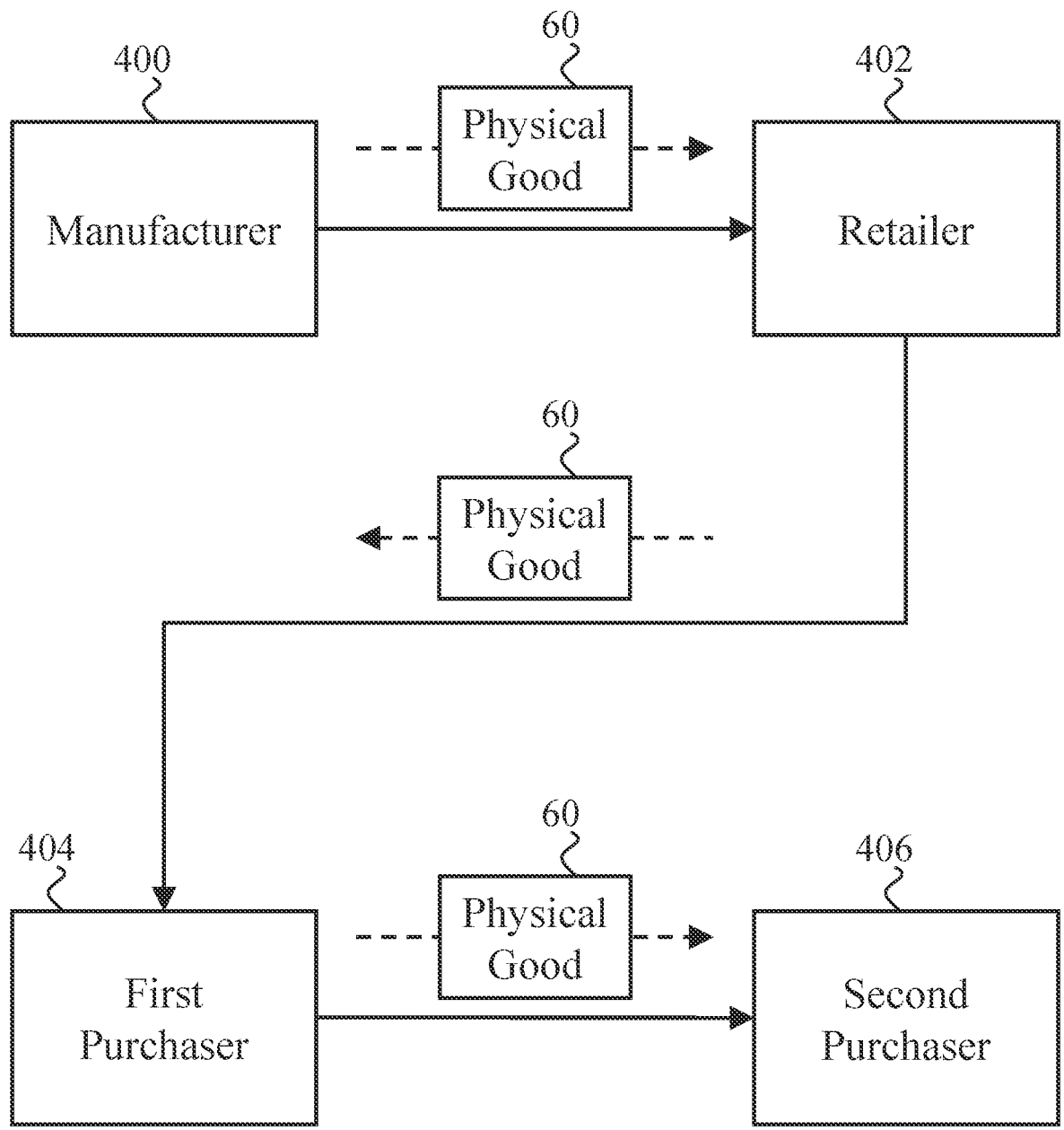
FIG. 7 is a schematic diagram illustrating a process flow from manufacturing to resale in which each operation can leverage the described embodiments.

FIG. 7 is a schematic diagram illustrating a process flow from manufacturing to resale of a physical good (60) in which each operation can leverage the described embodiments. A manufacturer (400) can leverage the digital passport (e.g., as shown in FIG. 3) to provide (or, in an example, provide a link to) sourcing and environmental impact information that is associated with manufacturing the product. As discussed in the context of at least FIG. 2, this information in the digital passport will be available to each owner in the secondary market, thereby maintaining the provenance and manufacturing bona fides of the physical good (60) Similarly, and in another example, a subset of this information is made available in an authentication mechanism that uniquely identifies the physical good (60) and is configured to remain with the physical good (60) throughout its lifecycle. In yet another example, the manufacturer (400) can leverage the disclosed technology to authenticate the physical good (60), thereby preventing counterfeiting because any counterfeit products would not be able to access the digital passport.

Figure 9A:
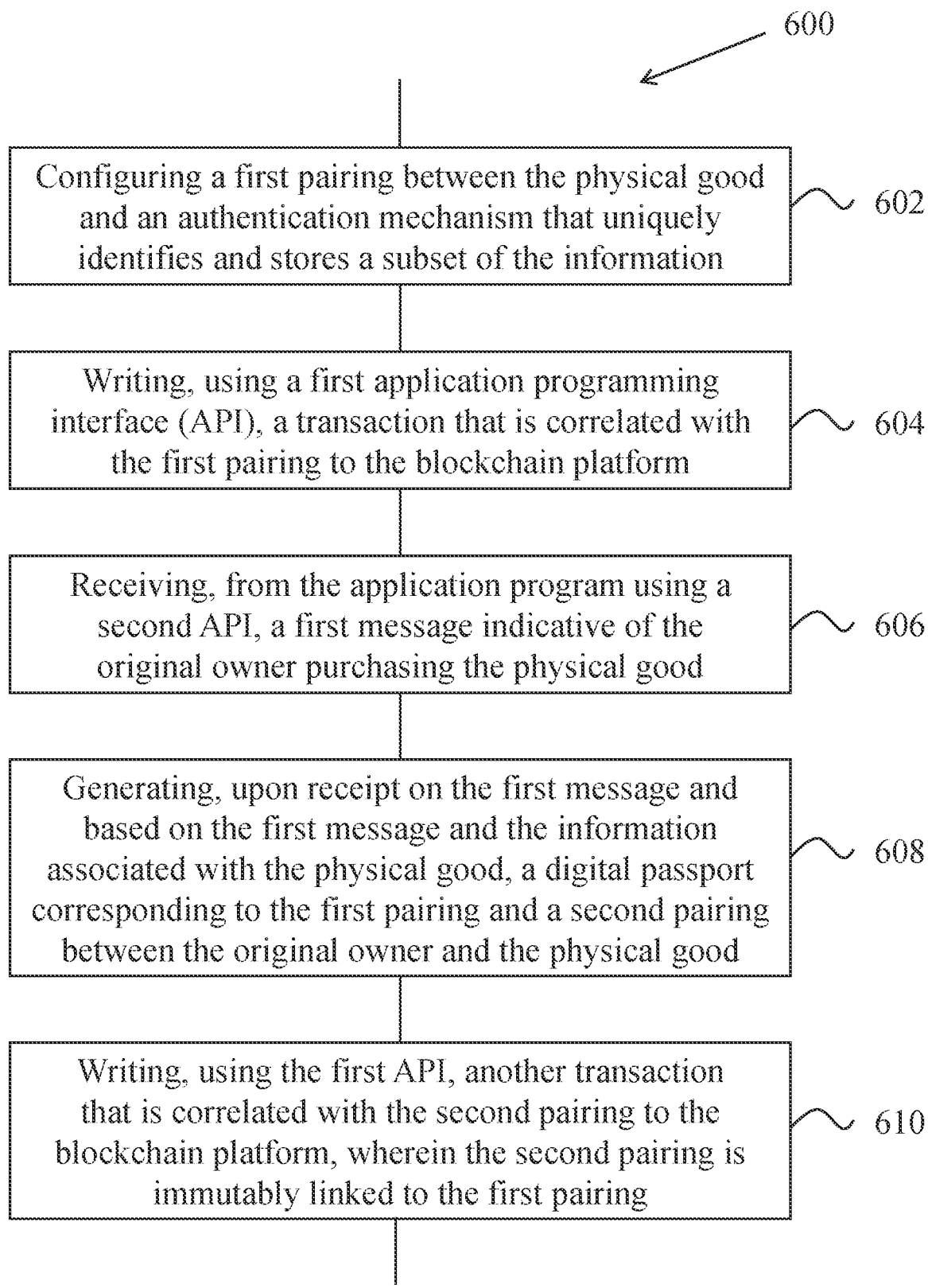
FIGS. 9A and 9B are flowcharts of example methods for blockchain-based asset authentication.
Figure 9B:
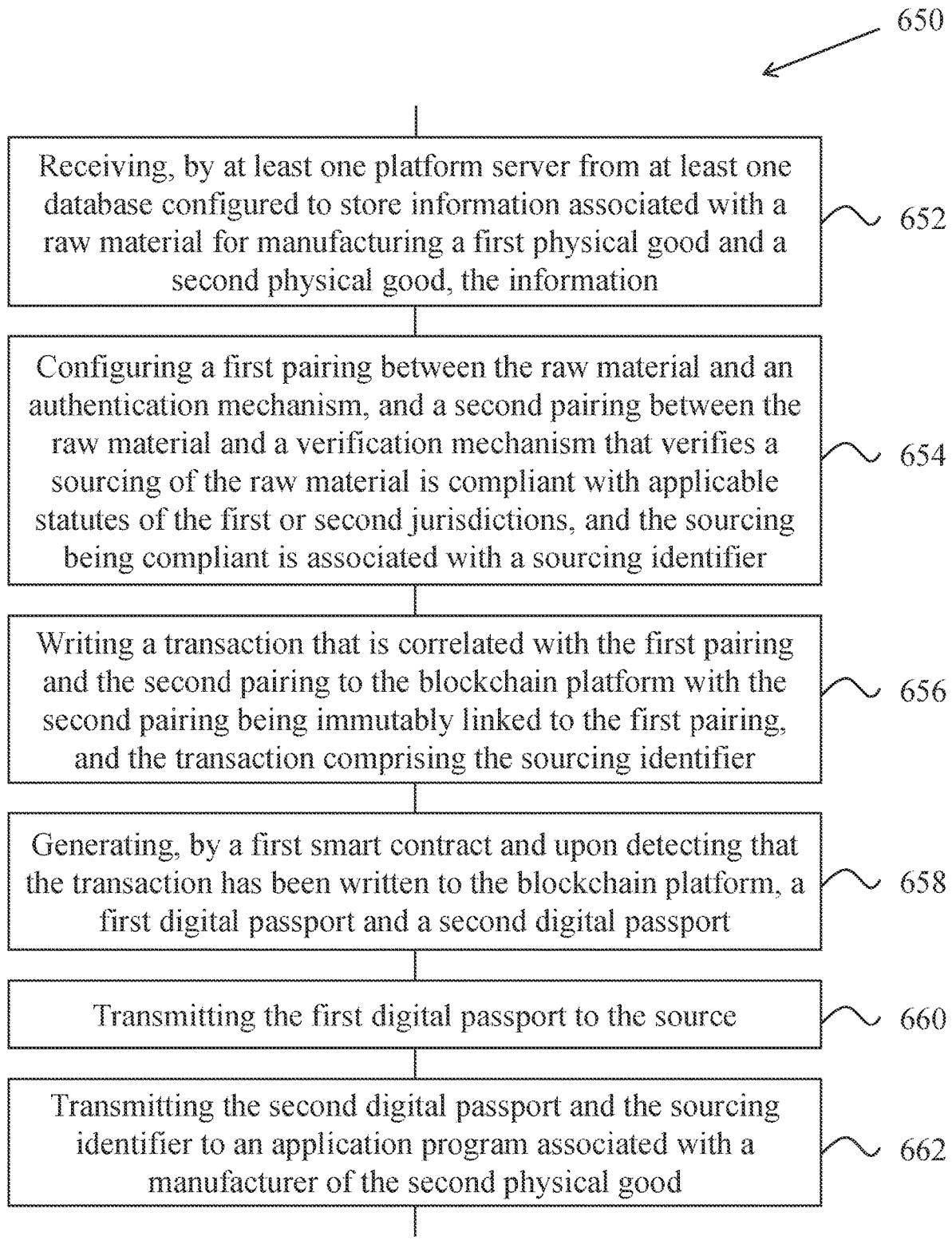

Similarly, a retailer (402) can leverage the disclosed embodiments to streamline the regulation and permitting process, thereby ensuring that the physical good (60) can get from the manufacturer (400) to the retailer (402) quickly (and further detailed in the context of FIG. 9B). Currently, the regulation and permitting process in the international trade of luxury goods (and even their raw materials) is subject to the whims of exporting and importing authorities. For example, a physical good (60) primarily made in Switzerland, which is to be sold in Paris, requires a Swiss export permit and a French import permit. However, each of the permitting authorities operate fairly independently, and due to permits and inspections required, do so on their own timelines. The exporting country (e.g., Switzerland) might require two days, whereas the importing country (e.g., France) may take multiple weeks to process the paperwork. With the digital passport and the pairing between the physical good (60) and the manufacturer (400) being correlated with a transaction written to the blockchain, the importing and exporting authorities will have real-time access to the same digital information, which is likely to significantly speed up the permitting and inspection process. In addition, the disclosed technology will provide wholistic supply chain transparency for the consumer while solving non-governmental organization (NGO) and government processes and inefficiencies globally, along with tackling counterfeit goods.

At the end of the typical retail chain, a first purchaser (404) may acquire the physical good (60) either in-store or online from the retailer (402). Upon acquisition of the physical good (60), the digital passport, which corresponds to a first pairing between the physical good (60) and an authentication mechanism (not shown in FIG. 7) and a second pairing between the first purchaser (404) and the physical good (60), is generated and can be downloaded to a digital Web3 wallet of the first purchaser (404).

As previously discussed, the digital passport may be a QR code that is associated with the physical good (60), and enables the first purchaser (404) to access exclusive events and/or promotions associated with, for example, the manufacturer (400) of the physical good (60). The digital passport (e.g., QR code in a Web3 wallet) allows the first purchaser (404) to benefit from the investment made in the physical good (60) from both online and in-person events.

On the secondary market, a second purchaser (406) can acquire the physical good (60) from the first purchaser (404). Upon verification of the acquisition of the physical good (60) by the second purchaser (406), the digital passport of the first purchaser (404) is revoked or deactivated. In an example, the revocation or deactivation can be performed by the described embodiments. Alternatively, the described embodiments can instruct third-party software to perform the revocation or deactivation procedures. A new digital passport is generated for the second purchaser (406) who is now the new owner of the physical good (60). Now, the second purchaser (406) can benefit from access to exclusive events and/or promotions associated with, for example, the manufacturer (400) of the physical good (60), whereas the first purchaser (404) is now restricted from these events due to his/her digital passport being revoked or deactivated (or voided).

Figure 8:
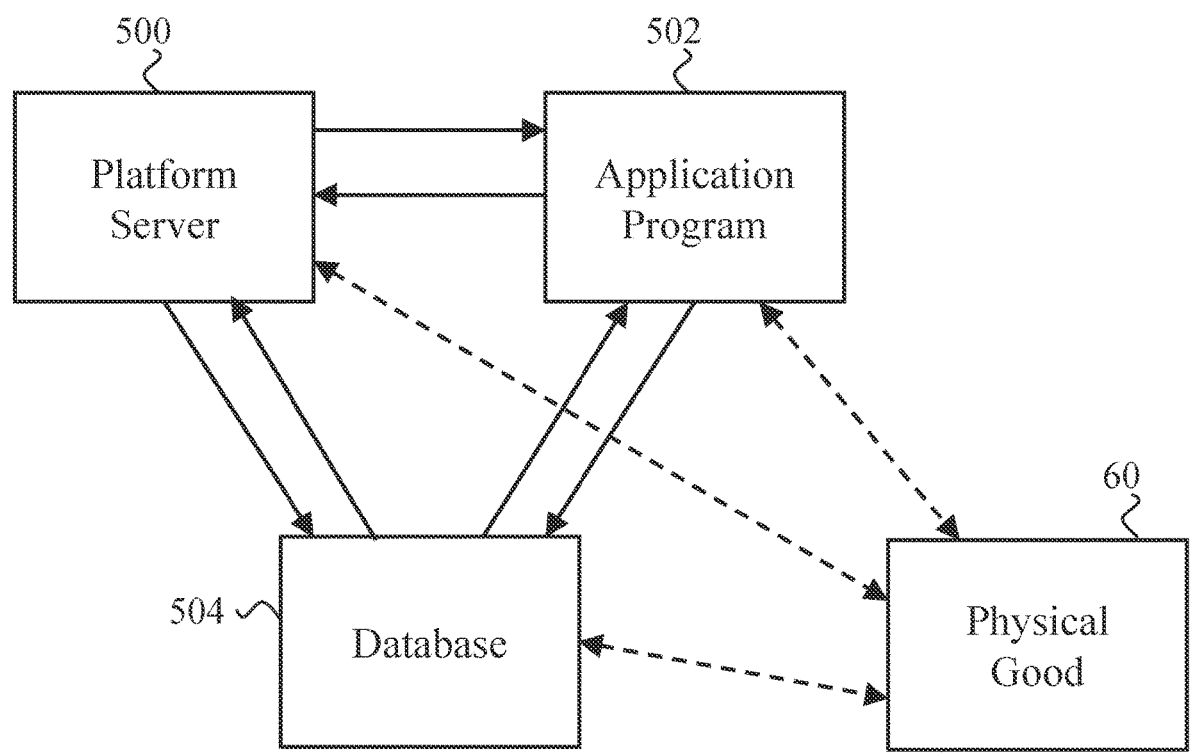
FIG. 8 is a schematic diagram illustrating the interactions between components of embodiments in accordance with the disclosed technology.

FIG. 8 is a schematic diagram illustrating the interactions between components of embodiments in accordance with the disclosed technology. As shown therein, an example system includes a platform server (500), an application program (502) that may be operating on a wireless device of the owner of the physical good or product (60), and a database (504) that stores information associated with the physical good (60). In an example, the platform server (500) is configured to perform the example method shown in FIG. 9A, and described below. In another example, the database (504) corresponds to the public database (30) shown in FIG. 1 and FIG. 5. As previously discussed, the database stores information associated with the physical good (60). A first subset of the information can be stored on the authentication mechanism (e.g., an RFID tag or an NFC tag), and a second subset of the information can be stored in the digital passport. The database (504) being communicatively coupled to the platform server (500), which is associated with the blockchain platform, ensures that the information across the database (504), the authentication mechanism, and the digital passport remains consistent, traceable, and immutable. This ensures that any purchaser using the application program (502) and having verifiably acquired the physical good (60) will have access to the benefits that are associated with ownership of the physical good (60).

In some embodiments, the example system shown in FIG. 8 is used in the transfer of raw materials from a first jurisdiction to a second jurisdiction in which the physical good is manufactured using the raw materials from the first jurisdiction. In other embodiments, the raw materials may be divided prior to only a portion being transferred to the second jurisdiction. In an example, an alligator hide ethically sourced in a first jurisdiction could be used to create a clutch purse (by a manufacturer in the second jurisdiction) and as part of an artwork (by the source in the first jurisdiction). Herein, the platform server (500) is configured to implement the method shown in FIG. 9B, wherein the platform server (500) generates two digital passports for the source, one for each portion of the alligator hide that will be used separately. The first digital passport, owned by the source, is sent to the manufacturer to provide to any border authorities to enable the importation of one portion of the alligator hide, whereas the second digital passport remains with the source (and corresponds to the portion of the alligator hide to be used to create the artwork). Once the manufacturer acquires their portion of the alligator hide, the first digital passport is revoked (or deactivated), and a new digital passport that corresponds to a pairing between the manufacturer and the ethically-sourced portion of the alligator hide to be used for the clutch purse is generated. Using the described embodiments automates the currently paper-based permitting process that is highly prone to manipulations and errors, and is subject to many drawbacks, e.g., fraud, counterfeiting, and long processing times.

FIG. 9A is a flowchart of an example method (600) for blockchain-based asset authentication. The method (600) includes, in an operation (602), performing a first pairing between a physical good and an authentication mechanism that uniquely identifies and stores a subset of the information.

The method (600) includes, in an operation (604), writing, using a first application programming interface (API), a transaction that is correlated with the first pairing to the blockchain platform. In this and other examples discussed herein, the platform server writes the transaction to the blockchain platform. Alternatively, in these examples, the platform server may instruct a third-party to write the transaction to the blockchain.

The method (600) includes, in an operation (606), receiving, from an application program using a second API different from the first API, a first message indicative of an owner acquiring the physical good (e.g., through a sale, exchange, or gift). In some embodiments, the application program is associated with the owner. In an example, the first API is the Polygon.io Crypto API and the second API is a third-party API that is compatible with the application program.

The method (600) includes, in an operation (608), generating, upon receipt on the first message and based on the first message and the information associated with the physical good, a digital passport. Herein, the digital passport corresponds to the first pairing and a second pairing between the owner and the physical good.

The method (600) includes, in an operation (610), writing, using the first API, another transaction that is correlated with the second pairing to the blockchain platform, with the second pairing being immutably linked to the first pairing.

In some embodiments, the method (600) includes the operation of receiving, by a platform server associated with a blockchain platform from a database, information associated with a physical good.

In some embodiments, the authentication mechanism is a Radio Frequency Identification (RFID) tag, a Near Field Communication (NFC) tag, or a holographic sticker that is affixed on outward facing packaging of the physical good, and wherein the authentication mechanism is configured to remain with the physical good through its lifecycle. In an example, the holographic sticker is created using an electron-beam lithography system, and wherein the holographic sticker displays "OnChain Verified"™ as part of the authentication mechanism.

In some embodiments, the authentication mechanism is an image capture device (e.g., a cellphone camera, as implemented by Veracity Protocol™ for authentication). In an example, a vectorized or rasterized image of the physical good is generated as the authentication mechanism, and can capture the specific variations of a particular copy of the physical good, i.e., any manufacturing variations in the luxury goods, which are typically handmade, will be preserved in the vectorized or rasterized image. This authentication information can be stored, in part or in full, in the database shown in FIGS. 1, 5 and 8, an authentication tag, and/or the digital passport. In other embodiments, the authentication mechanism is a secure hologram sticker (e.g., created with electron-beam lithography systems and displaying "OnChain Verified" to verify its authenticity) that can be placed on outward facing packaging of the physical good.

In some embodiments, the application program is further configured to store the digital passport in a digital Web3 wallet.

In some embodiments, the platform server is further configured to create a digital representation of the physical good, and write, using the first API, yet another transaction that is correlated with a third pairing between the digital representation and the physical good to the blockchain platform. Herein, the third pairing is immutably linked to the first pairing and the second pairing, and the digital representation can be used exclusively by the owner in a metaverse. Herein, the owner is able to use the physical good as well as the digital representation, e.g., in Second Life™, any augmented reality (AR) or virtual reality (VR) platform, or metaverse by Facebook™.

In some embodiments, the digital representation is a non-fungible token (NFT).

In some embodiments, the digital passport enables the owner to access a marketing event associated with a manufacturer of the physical good, a partnership promotion associated with other owners of other instances of the physical good, or a cross-selling event associated with manufacturers of other goods that are similar to the physical good.

In some embodiments, the physical good comprises a luxury good, a collectible, an artwork, or a product in a supply chain. In an example, the described embodiments are applied to luxury goods, artwork, collectibles, and/or memorabilia, which are typically manufactured in limited quantities. The authentication mechanism authenticates the provenance of these physical goods, and the digital passport enables verified owners of these physical goods to access exclusive events and partnership promotions. In another example, the described embodiments are applied to products (or raw materials, natural goods, or manufactured goods) in a supply chain. Here, the authentication mechanism authenticates the sourcing of the products to ensure that it is compliant with any jurisdictional requirements.

In some embodiments, the method (600) further includes the operation of sending the digital passport to an insurance coverage provider, which issues a policy covering the physical good against a loss due to theft or destruction of the physical good. Having access to the digital passport streamlines the insurance process for the insurance coverage provider because the provenance and sourcing of the physical good has already been verified in the digital passport, and the insurance coverage provider will not typically need any additional information.

In some embodiments, the at least one application program is further configured to transmit, to the at least one platform server using the second API, a second message indicative of a subsequent owner acquiring the physical good. Then, the at least one platform server is further configured to revoke or deactivate, upon receipt of the second message, the digital passport. Upon revoking or deactivating the digital passport, the at least one platform server generates, based on the second message and the information, a new digital passport corresponding to the first pairing and a third pairing between the subsequent owner and the physical good. The at least one platform server now writes, using the first API, yet another transaction that is correlated with the third pairing to the blockchain platform. Herein, a link between the second pairing and the first pairing is invalidated, and the third pairing is immutably linked to the first pairing. The new digital passport is finally transmitted to the subsequent owner. As previously discussed, this enables a subsequent owner to now access exclusive events and/or promotions associated with the physical good using the new digital passport. These benefits were previously accessible to the owner when he/she owned the physical good, but cannot be accessed now because the digital passport has been revoked or deactivated.

In some embodiments, the platform server is further configured to create a digital representation of the physical good, and write, using the first API, yet another transaction that is correlated with a fourth pairing between the digital representation and the physical good. Herein, the fourth pairing is immutably linked to the third pairing and the first pairing, and the digital representation can be used exclusively by the subsequent owner in a metaverse.

In some embodiments, the new digital passport enables the subsequent owner to access an event associated with a manufacturer of the physical good, but the owner is restricted from accessing the event due to the digital passport being revoked or deactivated.

In some embodiments, the information associated with the physical good comprises a product serial number, a product description, a manufacturing date, a proof of authenticity, and/or compliance information.

In some embodiments, the digital passport comprises a QR code, an encoded visual identifier, or a unique wireless signal. In other embodiments, the digital passport comprises a portion of the subset of the information associated with the physical good.

Embodiments of the disclosed technology further provide an example system for blockchain-based asset authentication. The system includes at least one platform server associated with a blockchain platform, at least one database configured to store information associated with a physical good, and at least one application program associated with an owner of the physical good. In this system, the at least one platform server configures a first pairing between the physical good and an authentication mechanism that uniquely identifies and stores a subset of the information, and then writes, using a first application programming interface (API), a transaction that is correlated with the first pairing to the blockchain platform. This is followed by the at least one application program transmitting, to the at least one platform server using a second API different from the first API, a first message indicative of the owner acquiring the physical good. Once the physical good has been purchased by the owner (e.g., either online or in-person), the at least one platform server receives, from the at least one application program using the second API, the first message. Upon receipt of the first message, the at least one platform server generates, based on the first message and the information associated with the physical good, a digital passport corresponding to the first pairing and a second pairing between the owner and the physical good. Then, another transaction that is correlated with the second pairing is written, using the first API, to the blockchain platform such that the second pairing is immutably linked to the first pairing.

In some embodiments, the blockchain platform comprises a public blockchain platform that uses a proof-of-stake consensus mechanism for processing on-chain transactions and a native token that is compatible with an ERC-20 token, e.g., Polygon™ blockchain platform or Ethereum™ blockchain platform.

In some embodiments, the blockchain platform comprises a permissioned blockchain platform. In an example, using a permissioned blockchain enables the authenticity of a purchase of the physical good by the subsequent owner is based on a third-party validator or a gated NFT. In another example, the permissioned blockchain is configured to operate with each of the participants (e.g., the manufacturer, the retailer, the original and subsequent purchasers, and, if applicable, regulatory authorities or validators) who have their own credentials and blockchain permissions (e.g., read and/or write capabilities).

FIG. 9B is a flowchart of another example method (650) for blockchain-based asset authentication. The method (650) includes, in an operation (652), receiving, by at least one platform server from at least one database, information associated with a raw material for manufacturing a first physical good and a second physical good. Herein, the at least one platform server is associated with a blockchain platform and a plurality of smart contracts on the blockchain platform. In this example, the raw material is sourced in a first jurisdiction and the first and second physical goods are manufactured in a second jurisdiction different from the first jurisdiction. Furthermore, a first portion of the raw material is used to manufacture the first physical good and a second portion of the raw material is used to manufacture the second physical good.

The method (650) includes, in an operation (654), configuring a first pairing between the raw material and an authentication mechanism, and a second pairing between the raw material and a verification mechanism that verifies a sourcing of the raw material is compliant with applicable statutes of the first or second jurisdictions, and a compliance of the sourcing is associated with a sourcing identifier. Herein, the authentication mechanism uniquely identifies a source of the raw material and stores a subset of the information.

The method (650) includes, in an operation (656), writing a transaction that is correlated with the first pairing and the second pairing to the blockchain platform with the second pairing being immutably linked to the first pairing, and the transaction comprising the sourcing identifier. Herein, the transaction is written to the blockchain platform using a first application programming interface (API), e.g., the Polygon.io Crypto API for the Polygon™ blockchain platform.

The method (650) includes, in an operation (658), generating, by at least a first smart contract and upon detecting that the transaction has been written to the blockchain platform, a first digital passport and a second digital passport. Herein, the first digital passport corresponds to the first portion of the raw material, the first pairing, and the second pairing, and the second digital passport corresponds to the second portion of the raw material, the first pairing, and the second pairing.

The method (650) includes, in an operation (660), transmitting the first digital passport to the source of the raw material.

The method (650) includes, in an operation (662), transmitting the second digital passport and the sourcing identifier to an application program associated with a manufacturer of the second physical good.

In some embodiments, the method (650) further includes the application program being configured to transmit, upon receiving the second digital passport and the sourcing identifier, the second digital passport to a border authority of the second jurisdiction to enable import of the second portion of the raw material into the second jurisdiction. Then, the application program configures a third pairing between the second portion of the raw material and the manufacturer of the second physical good.

In some embodiments, the method (650) further includes the at least one platform server being configured, upon determining that the raw material has been physically acquired by the manufacturer, to revoke or deactivate the second digital passport by invalidating a link between the first pairing and the second pairing. Then, the at least one platform server writes another transaction correlated with the third pairing to the blockchain platform such that the third pairing is immutably linked to the second pairing. Finally, the at least one platform server generates a new digital passport corresponding to the second and third pairings, and transmits the new digital passport to the application program associated with the manufacturer of the second physical good.

In some embodiments, the first digital passport and the new digital passport are concurrently active, and enable both the source and the manufacturer to access one or more events associated with the raw material and/or the first and second physical goods.

Embodiments of the disclosed technology further provide another example system for blockchain-based asset authentication. The system includes a processor of at least one platform server associated with a blockchain platform, and a non-transitory memory, coupled to the processor, having code stored thereon, the code, when executed by the processor, causing the processor to perform a series of operations. The operations include receiving, by the at least one platform server from at least one database, information associated with a physical good. The at least one platform server then configures a first pairing between the physical good and an authentication mechanism that uniquely identifies and stores a subset of the information, and writes, using a first application programming interface (API), a transaction that is correlated with the first pairing to the blockchain platform. Next, the at least one platform server receives, from at least one application program using a second API different from the first API, a first message indicative of an owner acquiring the physical good. Upon receipt of the first message, the at least one platform server generates, based on the first message and the information associated with the physical good, a digital passport corresponding to the first pairing and a second pairing between the owner and the physical good. Another transaction that is correlated with the second pairing is written, using the first API, to the blockchain platform, such that the second pairing is immutably linked to the first pairing.

In some embodiments, the blockchain platform comprises a blockchain platform that uses a proof-of-stake consensus mechanism for processing on-chain transactions, and a completion time of the proof-of-stake consensus mechanism is based on a number of threads supported by the processor.

The described features can be implemented to further provide one or more of the following technical solutions:

A1. A system for blockchain-based asset authentication, comprising: at least one platform server associated with a blockchain platform; at least one database configured to store information associated with a physical good; and at least one application program associated with an owner of the physical good, wherein the at least one platform server is configured to: configure a first pairing between the physical good and an authentication mechanism that uniquely identifies and stores a subset of the information, and write, using a first application programming interface (API), a transaction that is correlated with the first pairing to the blockchain platform, wherein the at least one application program is configured to: transmit, to the at least one platform server using a second API different from the first API, a first message indicative of the owner acquiring the physical good, and wherein the at least one platform server is further configured to: receive, from the at least one application program using the second API, the first message, generate, upon receipt on the first message and based on the first message and the information associated with the physical good, a digital passport corresponding to the first pairing, and a second pairing between the owner and the physical good, and write, using the first API, another transaction that is correlated with the second pairing to the blockchain platform, wherein the second pairing is immutably linked to the first pairing.

A2. The system of solution A1, wherein the authentication mechanism is a Radio Frequency Identification (RFID) tag, a Near Field Communication (NFC) tag, or a holographic sticker that is affixed on outward facing packaging of the physical good, and wherein the authentication mechanism is configured to remain with the physical good through its lifecycle.

A3. The system of solution A2, wherein the holographic sticker is created using an electron-beam lithography system, and wherein the holographic sticker displays "OnChain Verified" as part of the authentication mechanism.

A4. The system of any of solutions A1 to A3, wherein the authentication mechanism is an image capture device.

A5. The system of any of solutions A1 to A4, wherein the at least one application program is further configured to store the digital passport in a digital Web3 wallet.

A6. The system of any of solutions A1 to A5, wherein the at least one platform server is further configured to: create a digital representation of the physical good; and write, using the first API, another transaction that is correlated with a third pairing between the digital representation and the physical good, wherein the third pairing is immutably linked to the first pairing and the second pairing, and the digital representation can be used exclusively by the owner in a metaverse.

A7. The system of solution A6, wherein the digital representation is a non-fungible token (NFT).

A8. The system of any of solutions A1 to A7, wherein the digital passport enables the owner to access a marketing event associated with a manufacturer of the physical good, a partnership promotion associated with other owners of other instances of the physical good, or a cross-selling event associated with manufacturers of other goods that are similar to the physical good.

A9. The system of any of solutions A1 to A8, wherein the physical good comprises a luxury good, a collectible, an artwork, or a product in a supply chain.

A10. The system of any of solutions A1 to A9, wherein the at least one application program is further configured to: transmit, to the at least one platform server using the second API, a second message indicative of a subsequent owner acquiring the physical good, and wherein the at least one platform server is further configured to: revoke or deactivate, upon receipt of the second message, the digital passport, generate, based on the second message and the information, a new digital passport corresponding to the first pairing and a third pairing between the subsequent owner and the physical good, write, using the first API, yet another transaction that is correlated with the third pairing to the blockchain platform, wherein a link between the second pairing and the first pairing is invalidated, and wherein the third pairing is immutably linked to the first pairing, and transmit the new digital passport to the subsequent owner.

A11. The system of solution A10, wherein the at least one platform server is further configured to: create a digital representation of the physical good; and write, using the first API, still another transaction that is correlated with a fourth pairing between the digital representation and the physical good, wherein the fourth pairing is immutably linked to the third pairing and the first pairing, and wherein the digital representation can be used exclusively by the subsequent owner in a metaverse.

A12. The system of solution A10, wherein the new digital passport enables the subsequent owner to access an event associated with a manufacturer of the physical good, and wherein each previous owner is restricted from accessing the event due to the digital passport being revoked or deactivated.

A13. The system of solution A10, wherein an authenticity of a purchase of the physical good by the subsequent owner is based on a third-party validator, a gated non-fungible token (NFT), or a digital indication to the third pairing on the blockchain platform.

A14. The system of any of solutions A1 to A13, wherein the information associated with the physical good comprises a product serial number, a product description, a manufacturing date, a proof of authenticity, and/or compliance information.

A15. The system of any of solutions A1 to A13, wherein the digital passport comprises a QR code, an encoded visual identifier, or a unique wireless signal.

A16. The system of any of solutions A1 to A13, wherein the digital passport comprises a portion of the subset of the information associated with the physical good.

A17. A method for blockchain-based asset authentication, comprising: receiving, by at least one platform server associated with a blockchain platform from at least one database, information associated with a physical good; configuring a first pairing between the physical good and an authentication mechanism that uniquely identifies and stores a subset of the information; writing, using a first application programming interface (API), a transaction that is correlated with the first pairing to the blockchain platform; receiving, from at least one application program using a second API different from the first API, a first message indicative of an owner acquiring the physical good, wherein the at least one application program is associated with the owner; generating, upon receipt of the first message and based on the first message and the information associated with the physical good, a digital passport corresponding to the first pairing, and a second pairing between the owner and the physical good; and writing, using the first API, another transaction that is correlated with the second pairing to the blockchain platform, wherein the second pairing is immutably linked to the first pairing.

A18. The method of solution A17, wherein the blockchain platform comprises a public blockchain platform that uses a proof-of-stake consensus mechanism for processing on-chain transactions and a native token that is compatible with an ERC-20 token.

A19. The method of solution A17 or A18, wherein the blockchain platform comprises a permissioned blockchain platform.

A20. The method of any of solutions A17 to A19, further comprising: transmitting, to an insurance coverage provider, the digital passport; and receiving, from the insurance coverage provider, a policy covering the physical good against a loss due to theft or destruction of the physical good.

A21. A system for blockchain-based asset authentication, comprising: a processor of at least one platform server associated with a blockchain platform; and a non-transitory memory, coupled to the processor, having code stored thereon, the code, when executed by the processor, causing the processor to: receive, by the at least one platform server from at least one database, information associated with a physical good; configure a first pairing between the physical good and an authentication mechanism that uniquely identifies and stores a subset of the information; write, using a first application programming interface (API), a transaction that is correlated with the first pairing to the blockchain platform; receive, from at least one application program using a second API different from the first API, a first message indicative of an owner acquiring the physical good, wherein the at least one application program is associated with the owner; generate, upon receipt on the first message and based on the first message and the information associated with the physical good, a digital passport corresponding to the first pairing and a second pairing between the owner and the physical good; and write, using the first API, another transaction that is correlated with the second pairing to the blockchain platform, wherein the second pairing is immutably linked to the first pairing.

A22. The system of solution A21, wherein the blockchain platform comprises a public blockchain platform that uses a proof-of-stake consensus mechanism for processing on-chain transactions.

A23. The system of solution A22, wherein a completion time of the proof-of-stake consensus mechanism is based on a number of threads supported by the processor.

A24. A system for blockchain-based asset authentication, comprising: at least one platform server associated with a blockchain platform and a plurality of smart contracts on the blockchain platform; at least one database configured to store information associated with a raw material for manufacturing a physical good; a first application program associated with a source of the raw material; and a second application program associated with a manufacturer of the physical good, wherein the raw material is sourced in a first jurisdiction and the physical good is manufactured in a second jurisdiction, wherein the first application program configures: a first pairing between the raw material and an authentication mechanism that uniquely identifies the source of the raw material and stores a subset of the information, and a second pairing between the raw material and a verification mechanism which verifies that sourcing of the raw material is compliant with applicable statutes of the first jurisdiction and/or the second jurisdiction, wherein a compliance of the sourcing is associated with a sourcing identifier, wherein the at least one platform server writes a first transaction correlated with the first pairing and a second transaction correlated with the second pairing to the blockchain platform, and wherein the second pairing is immutably linked to the first pairing, wherein the second transaction comprises the sourcing identifier, wherein at least a first smart contract of the plurality of smart contracts: generates, upon detecting that the first transaction and the second transaction have been written to the blockchain platform, a digital passport corresponding to the first pairing and the second pairing, transmits the digital passport to the source of the raw material, and transmits the digital passport and the sourcing identifier to the second application program, wherein the second application program: transmits, upon receiving the digital passport and the sourcing identifier, the digital passport to a border authority of the second jurisdiction to enable import of the raw material into the second jurisdiction, and configures a third pairing between the raw material and another authentication mechanism that uniquely identifies the manufacturer of the physical good, wherein at least a second smart contract of the plurality of smart contracts, upon determining that the raw material has been physically acquired by the manufacturer: revokes or deactivates the digital passport by invalidating a link between the second pairing and the first pairing, writes a third transaction correlated with the third pairing to the blockchain platform, wherein the third pairing is immutably linked to the second pairing, generates a new digital passport corresponding to the second pairing and the third pairing, and transmits the new digital passport to the manufacturer.

A25. The system of solution A24, wherein the sourcing identifier comprises a certificate number of a Convention on International Trade in Endangered Species of Wild Fauna and Flora permit.

A26. The system of solution A24 or A25, wherein the information associated with the raw material comprises a common name, a scientific name, a country of origin, and a permit number.

A27. The system of any of solutions A24 to A26, the blockchain platform comprises a public blockchain platform that uses a proof-of-stake consensus mechanism for processing on-chain transactions and a native token that is compatible with an ERC-20 token.

A28. The system of solution A27, wherein a completion time of the proof-of-stake consensus mechanism is based on a number of threads supported by a processor of the at least one platform server.

A29. The system of any of solutions A24 to A28, wherein the blockchain platform comprises a permissioned blockchain platform.

A30. The system of any of solutions A24 to A29, wherein the digital passport comprises a QR code, an encoded visual identifier, or a unique wireless signal.

A31. The system of any of solutions A24 to A30, wherein writing a transaction on the blockchain platform uses a first application programming interface (API), and wherein transmitting the digital passport uses a second API different from the first API.

A32. The system of any of solutions A24 to A31, wherein the first application program is configured to store the digital passport in a digital Web3 wallet.

A33. A method for blockchain-based asset authentication, comprising: receiving, by at least one platform server associated with a blockchain platform and a plurality of smart contracts on the blockchain platform from at least one database, information associated with a raw material for manufacturing a first physical good and a second physical good, wherein the raw material is sourced in a first jurisdiction and the first and second physical goods are manufactured in a second jurisdiction different from the first jurisdiction, and wherein a first portion of the raw material is used to manufacture the first physical good and a second portion of the raw material is used to manufacture the second physical good; configuring (a) a first pairing between the raw material and an authentication mechanism that uniquely identifies a source of the raw material and stores a subset of the information, and (b) a second pairing between the raw material and a verification mechanism that verifies a sourcing of the raw material is compliant with applicable statutes of the first or second jurisdictions, and wherein a compliance of the sourcing is associated with a sourcing identifier; writing, using a first application programming interface (API), a transaction that is correlated with the first pairing and the second pairing to the blockchain platform, wherein the second pairing is immutably linked to the first pairing, and wherein the transaction comprises the sourcing identifier; generating, by at least a first smart contract of the plurality of smart contracts and upon detecting that the transaction has been written to the blockchain platform, a first digital passport corresponding to the first portion of the raw material, the first pairing, and the second pairing, and a second digital passport corresponding to the second portion of the raw material, the first pairing, and the second pairing; transmitting the first digital passport to the source of the raw material; and transmitting the second digital passport and the sourcing identifier to an application program associated with a manufacturer of the second physical good.

A34. The method of solution A33, wherein the application program is configured to: transmit, upon receiving the second digital passport and the sourcing identifier, the second digital passport to a border authority of the second jurisdiction to enable import of the second portion of the raw material into the second jurisdiction; and configure a third pairing between the second portion of the raw material and the manufacturer of the second physical good.

A35. The method of solution A34, wherein the at least one platform server is configured, upon determining that the raw material has been physically acquired by the manufacturer, to: revoke or deactivate the second digital passport by invalidating a link between the first pairing and the second pairing; write another transaction correlated with the third pairing to the blockchain platform, wherein the third pairing is immutably linked to the second pairing; generate a new digital passport corresponding to the second and third pairings; and transmit the new digital passport to the application program.

A36. The method of solution A35, wherein the first digital passport and the new digital passport are concurrently active, and enable both the source and the manufacturer to access one or more events associated with the raw material and/or the first and second physical goods.

A37. The method of any of solutions A33 to A36, wherein the sourcing identifier comprises a certificate number of a Convention on International Trade in Endangered Species of Wild Fauna and Flora permit.

A38. The method of solution A37, the information associated with the raw material comprises a common name, a scientific name, a country of origin, and a permit number.

A39. A method for blockchain-based asset authentication using the system in one or more of solutions A1 to A16, solutions A21 to A23, and solutions A24 to A32.

A40. A system comprising a processor and a non-transitory memory having code stored thereon, the code, when executed by the processor, causing the processor to implement a method in one or more of solutions A17 to A20 and solutions A33 to A38.

The described features can be implemented to further provide one or more of the following technical solutions:

B1. A method for blockchain-based asset authentication, comprising: receiving, by at least one platform server associated with a blockchain platform and a plurality of smart contracts on the blockchain platform from at least one database, information associated with a raw material for manufacturing a first physical good and a second physical good, wherein the raw material is sourced in a first jurisdiction, wherein the first physical good or the second physical good is manufactured in a second jurisdiction different from the first jurisdiction, and wherein a first portion of the raw material is used to manufacture the first physical good and a second portion of the raw material is used to manufacture the second physical good; configuring (a) a first pairing between the raw material and an authentication mechanism that uniquely identifies a source of the raw material and stores a subset of the information, and (b) a second pairing between the raw material and a verification mechanism that verifies a sourcing of the raw material is compliant with applicable statutes of the first jurisdiction or the second jurisdiction, and wherein a compliance of the sourcing is associated with a sourcing identifier; writing, using a first application programming interface (API), a transaction that is correlated with the first pairing and the second pairing to the blockchain platform, wherein the second pairing is immutably linked to the first pairing, and wherein the transaction comprises the sourcing identifier; generating, by at least a first smart contract of the plurality of smart contracts and upon detecting that the transaction has been written to the blockchain platform, a first digital passport corresponding to the first portion of the raw material, the first pairing, and the second pairing, and a second digital passport corresponding to the second portion of the raw material, the first pairing, and the second pairing; transmitting the first digital passport to the source of the raw material; and transmitting the second digital passport and the sourcing identifier to an application program associated with a manufacturer of the second physical good.

B2. The method of solution B1, wherein the application program is configured to: transmit, upon receiving the second digital passport and the sourcing identifier, the second digital passport to a border authority of the second jurisdiction to enable import of the second portion of the raw material into the second jurisdiction; and configure a third pairing between the second portion of the raw material and the manufacturer of the second physical good.

B3. The method of solution B2, wherein the at least one platform server is configured, upon determining that the raw material has been physically acquired by the manufacturer, to: revoke or deactivate the second digital passport by invalidating a link between the first pairing and the second pairing; write another transaction correlated with the third pairing to the blockchain platform, wherein the third pairing is immutably linked to the second pairing; generate a new digital passport corresponding to the second pairing and the third pairing; and transmit the new digital passport to the application program.

B4. The method of solution B3, wherein the first digital passport and the new digital passport are concurrently active, and enable both the source and the manufacturer to access one or more events associated with the raw material, the first physical good and/or the second physical good.

B5. The method of solution B1, wherein the sourcing identifier comprises a certificate number of a Convention on International Trade in Endangered Species of Wild Fauna and Flora permit.

B6. The method of solution B5, the information associated with the raw material comprises a common name, a scientific name, a country of origin, and a permit number.

B7. The method of solution B 1, wherein the authentication mechanism is a Radio Frequency Identification (RFID) tag, a Near Field Communication (NFC) tag, or a holographic sticker that is affixed on outward facing packaging of the first physical good or the second physical good, and wherein the authentication mechanism is configured to remain with the first physical good or the second physical good through its lifecycle.

B8. The method of solution B7, wherein the holographic sticker is created using an electron-beam lithography system, and wherein the holographic sticker displays "OnChain Verified" as part of the authentication mechanism.

B9. The method of solution B1, wherein the second physical good comprises a luxury good.

B10. The method of solution B9, wherein the manufacturer is configured to: transmit, to an insurance coverage provider, the second digital passport; and receiving, from the insurance coverage provider, a policy covering the luxury good against a loss due to theft or destruction of the luxury good.

B11. The method of solution B1, wherein the first digital passport or the second digital passport comprises a QR code, an encoded visual identifier, or a unique wireless signal.

B12. The method of solution B1, wherein the blockchain platform comprises a public blockchain platform that uses a proof-of-stake consensus mechanism for processing on-chain transactions and a native token that is compatible with an ERC-20 token.

B13. The method of solution B12, wherein a completion time of the proof-of-stake consensus mechanism is based on a number of threads supported by at least one processor in the at least one platform server.

B14. The method of solution B1, wherein the blockchain platform comprises a permissioned blockchain platform.

B15. A system for blockchain-based asset authentication, comprising: a processor of at least one platform server associated with a blockchain platform; and a non-transitory memory, coupled to the processor, having code stored thereon, the code, when executed by the processor, causing the processor to: receive, by at least one platform server associated with a blockchain platform and a plurality of smart contracts on the blockchain platform from at least one database, information associated with a raw material for manufacturing a first physical good and a second physical good, wherein the raw material is sourced in a first jurisdiction, wherein the first physical good or the second physical good is manufactured in a second jurisdiction different from the first jurisdiction, and wherein a first portion of the raw material is used to manufacture the first physical good and a second portion of the raw material is used to manufacture the second physical good; configure (a) a first pairing between the raw material and an authentication mechanism that uniquely identifies a source of the raw material and stores a subset of the information, and (b) a second pairing between the raw material and a verification mechanism that verifies a sourcing of the raw material is compliant with applicable statutes of the first jurisdiction or the second jurisdiction, and wherein a compliance of the sourcing is associated with a sourcing identifier; write, using a first application programming interface (API), a transaction that is correlated with the first pairing and the second pairing to the blockchain platform, wherein the second pairing is immutably linked to the first pairing, and wherein the transaction comprises the sourcing identifier; generate, by at least a first smart contract of the plurality of smart contracts and upon detecting that the transaction has been written to the blockchain platform, a first digital passport corresponding to the first portion of the raw material, the first pairing, and the second pairing, and a second digital passport corresponding to the second portion of the raw material, the first pairing, and the second pairing; transmit the first digital passport to the source of the raw material; and transmit the second digital passport and the sourcing identifier to an application program associated with a manufacturer of the second physical good.

B16. The system of solution B15, wherein the blockchain platform comprises a public blockchain platform that uses a proof-of-stake consensus mechanism for processing on-chain transactions.

B17. The system of solution B16, wherein a completion time of the proof-of-stake consensus mechanism is based on a number of threads supported by the processor.

B18. The system of solution B15, wherein the sourcing identifier comprises a certificate number of a Convention on International Trade in Endangered Species of Wild Fauna and Flora permit, and wherein the information associated with the raw material comprises a common name, a scientific name, a country of origin, and a permit number.

B19. The system of solution B15, wherein the authentication mechanism is a Radio Frequency Identification (RFID) tag, a Near Field Communication (NFC) tag, or a holographic sticker that is affixed on outward facing packaging of the first physical good or the second physical good, and wherein the authentication mechanism is configured to remain with the first physical good or the second physical good through its lifecycle.

B20. A non-transitory computer readable medium storing instructions that, when executed by a computing device, cause the computing device to perform a method for blockchain-based asset authentication, the instructions comprising: instructions for receiving, by at least one platform server associated with a blockchain platform and a plurality of smart contracts on the blockchain platform from at least one database, information associated with a raw material for manufacturing a first physical good and a second physical good, wherein the raw material is sourced in a first jurisdiction, wherein the first physical good or the second physical good is manufactured in a second jurisdiction different from the first jurisdiction, and wherein a first portion of the raw material is used to manufacture the first physical good and a second portion of the raw material is used to manufacture the second physical good; instructions for configuring (a) a first pairing between the raw material and an authentication mechanism that uniquely identifies a source of the raw material and stores a subset of the information, and (b) a second pairing between the raw material and a verification mechanism that verifies a sourcing of the raw material is compliant with applicable statutes of the first jurisdiction or the second jurisdiction, and wherein a compliance of the sourcing is associated with a sourcing identifier; instructions for writing, using a first application programming interface (API), a transaction that is correlated with the first pairing and the second pairing to the blockchain platform, wherein the second pairing is immutably linked to the first pairing, and wherein the transaction comprises the sourcing identifier; instructions for generating, by at least a first smart contract of the plurality of smart contracts and upon detecting that the transaction has been written to the blockchain platform, a first digital passport corresponding to the first portion of the raw material, the first pairing, and the second pairing, and a second digital passport corresponding to the second portion of the raw material, the first pairing, and the second pairing; instructions for transmitting the first digital passport to the source of the raw material; and instructions for transmitting the second digital passport and the sourcing identifier to an application program associated with a manufacturer of the second physical good.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of at least some of the subject matter described in this specification can be implemented as one or more computer program products, e.g., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements, and variations can be made based on what is described and illustrated in this patent document.

What is claimed is:

1. A method for blockchain-based asset authentication, comprising:
    receiving, by at least one platform server associated with a blockchain platform and a plurality of smart contracts on the blockchain platform from at least one database, information associated with a raw material for manufacturing a first physical good and a second physical good, wherein the raw material is sourced in a first jurisdiction, wherein the first physical good or the second physical good is manufactured in a second jurisdiction different from the first jurisdiction, and wherein a first portion of the raw material is used to manufacture the first physical good and a second portion of the raw material is used to manufacture the second physical good;
    configuring (a) a first pairing between the raw material and an authentication mechanism that uniquely identifies a source of the raw material and stores a subset of the information, and (b) a second pairing between the raw material and a verification mechanism that verifies a sourcing of the raw material is compliant with applicable statutes of the first jurisdiction or the second jurisdiction, and wherein a compliance of the sourcing is associated with a sourcing identifier;
    writing, using a first application programming interface (API), a transaction that is correlated with the first pairing and the second pairing to the blockchain platform, wherein the second pairing is immutably linked to the first pairing, and wherein the transaction comprises the sourcing identifier;
    generating, by at least a first smart contract of the plurality of smart contracts and upon detecting that the transaction has been written to the blockchain platform, a first digital passport corresponding to the first portion of the raw material, the first pairing, and the second pairing, and a second digital passport corresponding to the second portion of the raw material, the first pairing, and the second pairing;
    transmitting the first digital passport to the source of the raw material; and
    transmitting the second digital passport and the sourcing identifier to an application program associated with a manufacturer of the second physical good.

2. The method of claim 1, wherein the application program is configured to:
    transmit, upon receiving the second digital passport and the sourcing identifier, the second digital passport to a border authority of the second jurisdiction to enable import of the second portion of the raw material into the second jurisdiction; and
    configure a third pairing between the second portion of the raw material and the manufacturer of the second physical good.

3. The method of claim 2, wherein the at least one platform server is configured, upon determining that the raw material has been physically acquired by the manufacturer, to:
revoke or deactivate the second digital passport by invalidating a link between the first pairing and the second pairing;
write another transaction correlated with the third pairing to the blockchain platform, wherein the third pairing is immutably linked to the second pairing;
generate a new digital passport corresponding to the second pairing and the third pairing; and
transmit the new digital passport to the application program.

4. The method of claim 3, wherein the first digital passport and the new digital passport are concurrently active, and enable both the source and the manufacturer to access one or more events associated with the raw material, the first physical good and/or the second physical good.

5. The method of claim 1, wherein the sourcing identifier comprises a certificate number of a Convention on International Trade in Endangered Species of Wild Fauna and Flora permit.

6. The method of claim 5, the information associated with the raw material comprises a common name, a scientific name, a country of origin, and a permit number.

7. The method of claim 1, wherein the authentication mechanism is a Radio Frequency Identification (RFID) tag, a Near Field Communication (NFC) tag, or a holographic sticker that is affixed on outward facing packaging of the first physical good or the second physical good, and wherein the authentication mechanism is configured to remain with the first physical good or the second physical good through its lifecycle.

8. The method of claim 7, wherein the holographic sticker is created using an electron-beam lithography system, and wherein the holographic sticker displays "OnChain Verified" as part of the authentication mechanism.

9. The method of claim 1, wherein the second physical good comprises a luxury good.

10. The method of claim 9, wherein the manufacturer is configured to:
transmit, to an insurance coverage provider, the second digital passport; and
receiving, from the insurance coverage provider, a policy covering the luxury good against a loss due to theft or destruction of the luxury good.

11. The method of claim 1, wherein the first digital passport or the second digital passport comprises a QR code, an encoded visual identifier, or a unique wireless signal.

12. The method of claim 1, wherein the blockchain platform comprises a public blockchain platform that uses a proof-of-stake consensus mechanism for processing on-chain transactions and a native token that is compatible with an ERC-20 token.

13. The method of claim 12, wherein a completion time of the proof-of-stake consensus mechanism is based on a number of threads supported by at least one processor in the at least one platform server.

14. The method of claim 1, wherein the blockchain platform comprises a permissioned blockchain platform.

15. A system for blockchain-based asset authentication, comprising:
a processor of at least one platform server associated with a blockchain platform; and
a non-transitory memory, coupled to the processor, having code stored thereon, the code, when executed by the processor, causing the processor to:
receive, by at least one platform server associated with a blockchain platform and a plurality of smart contracts on the blockchain platform from at least one database, information associated with a raw material for manufacturing a first physical good and a second physical good, wherein the raw material is sourced in a first jurisdiction, wherein the first physical good or the second physical good is manufactured in a second jurisdiction different from the first jurisdiction, and wherein a first portion of the raw material is used to manufacture the first physical good and a second portion of the raw material is used to manufacture the second physical good;
configure (a) a first pairing between the raw material and an authentication mechanism that uniquely identifies a source of the raw material and stores a subset of the information, and (b) a second pairing between the raw material and a verification mechanism that verifies a sourcing of the raw material is compliant with applicable statutes of the first jurisdiction or the second jurisdiction, and wherein a compliance of the sourcing is associated with a sourcing identifier;
write, using a first application programming interface (API), a transaction that is correlated with the first pairing and the second pairing to the blockchain platform, wherein the second pairing is immutably linked to the first pairing, and wherein the transaction comprises the sourcing identifier;
generate, by at least a first smart contract of the plurality of smart contracts and upon detecting that the transaction has been written to the blockchain platform, a first digital passport corresponding to the first portion of the raw material, the first pairing, and the second pairing, and a second digital passport corresponding to the second portion of the raw material, the first pairing, and the second pairing;
transmit the first digital passport to the source of the raw material; and
transmit the second digital passport and the sourcing identifier to an application program associated with a manufacturer of the second physical good.

16. The system of claim 15, wherein the blockchain platform comprises a public blockchain platform that uses a proof-of-stake consensus mechanism for processing on-chain transactions.

17. The system of claim 16, wherein a completion time of the proof-of-stake consensus mechanism is based on a number of threads supported by the processor.

18. The system of claim 15, wherein the sourcing identifier comprises a certificate number of a Convention on International Trade in Endangered Species of Wild Fauna and Flora permit, and wherein the information associated with the raw material comprises a common name, a scientific name, a country of origin, and a permit number.

19. The system of claim 15, wherein the authentication mechanism is a Radio Frequency Identification (RFID) tag, a Near Field Communication (NFC) tag, or a holographic sticker that is affixed on outward facing packaging of the first physical good or the second physical good, and wherein the authentication mechanism is configured to remain with the first physical good or the second physical good through its lifecycle.

20. A non-transitory computer readable medium storing instructions that, when executed by a computing device, cause the computing device to perform a method for blockchain-based asset authentication, the instructions comprising:

instructions for receiving, by at least one platform server associated with a blockchain platform and a plurality of smart contracts on the blockchain platform from at least one database, information associated with a raw material for manufacturing a first physical good and a second physical good, wherein the raw material is sourced in a first jurisdiction, wherein the first physical good or the second physical good is manufactured in a second jurisdiction different from the first jurisdiction, and wherein a first portion of the raw material is used to manufacture the first physical good and a second portion of the raw material is used to manufacture the second physical good;

instructions for configuring (a) a first pairing between the raw material and an authentication mechanism that uniquely identifies a source of the raw material and stores a subset of the information, and (b) a second pairing between the raw material and a verification mechanism that verifies a sourcing of the raw material is compliant with applicable statutes of the first jurisdiction or the second jurisdiction, and wherein a compliance of the sourcing is associated with a sourcing identifier;

instructions for writing, using a first application programming interface (API), a transaction that is correlated with the first pairing and the second pairing to the blockchain platform, wherein the second pairing is immutably linked to the first pairing, and wherein the transaction comprises the sourcing identifier;

instructions for generating, by at least a first smart contract of the plurality of smart contracts and upon detecting that the transaction has been written to the blockchain platform, a first digital passport corresponding to the first portion of the raw material, the first pairing, and the second pairing, and a second digital passport corresponding to the second portion of the raw material, the first pairing, and the second pairing;

instructions for transmitting the first digital passport to the source of the raw material; and instructions for transmitting the second digital passport and the sourcing identifier to an application program associated with a manufacturer of the second physical good.

\* \* \* \* \*